(12) United States Patent
Das et al.

(10) Patent No.: US 8,335,767 B2
(45) Date of Patent: *Dec. 18, 2012

(54) MAINTAINING AND UTILIZING SQL EXECUTION PLAN HISTORIES

(75) Inventors: Dinesh Das, Redwood City, CA (US); Yali Zhu, Foster City, CA (US); Mohamed Ziauddin, Pleasanton, CA (US); Benoit Dageville, Foster City, CA (US); Hong Su, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 12/188,673

(22) Filed: Aug. 8, 2008

(65) Prior Publication Data

US 2009/0106321 A1    Apr. 23, 2009

Related U.S. Application Data

(60) Provisional application No. 60/980,710, filed on Oct. 17, 2007.

(51) Int. Cl.
*G06F 7/00* (2006.01)
*G06F 17/00* (2006.01)
*G06F 17/30* (2006.01)

(52) U.S. Cl. ......... 707/661; 707/666; 707/688; 707/721

(58) Field of Classification Search ...................... None
See application file for complete search history.

(56) References Cited

U.S. PATENT DOCUMENTS

| | | |
|---|---|---|
| 4,769,772 A | 9/1988 | Dwyer |
| 4,803,614 A | 2/1989 | Banba et al. |
| 4,829,427 A | 5/1989 | Green |
| 4,956,774 A | 9/1990 | Shibamiya et al. |
| 5,091,852 A | 2/1992 | Tsuchida et al. |
| 5,251,131 A | 10/1993 | Masand et al. |
| 5,287,459 A | 2/1994 | Gniewek |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |

(Continued)

OTHER PUBLICATIONS

Oracle® Database Performance Tuning Guide 10g Release 2 (10.2) "Using Plan Stability" pp. 18-1 to 18-10, 10gR2 released Jul. 11, 2005.

(Continued)

*Primary Examiner* — Susan Chen
(74) *Attorney, Agent, or Firm* — Hickman Palermo Truong Becker Bingham Wong LLP; Karl T. Rees

(57) ABSTRACT

Approaches, techniques, and mechanisms are disclosed for maintaining a history of query plans executed for a database command, along with information related to each query plan. A database server receives a request to execute a particular command. The database server determines a plan for executing the particular command. The database server adds first information to a plan history associated with the particular command. The plan history comprises information related to a plurality of plans that have been generated for the particular command. The first information may include, for example, properties of the plan (including an outline of the plan) as well as statistics collected during execution of the plan. The database server may implement techniques for periodically refreshing information in a plan history. The database server may also implement techniques for purging old or less important plans.

32 Claims, 7 Drawing Sheets

U.S. PATENT DOCUMENTS

| | | | |
|---|---|---|---|
| 5,412,804 A | 5/1995 | Krishna | |
| 5,412,806 A | 5/1995 | Du et al. | |
| 5,444,820 A | 8/1995 | Tzes et al. | |
| 5,452,468 A | 9/1995 | Peterson | |
| 5,459,837 A | 10/1995 | Caccavale | |
| 5,469,560 A | 11/1995 | Beglin | |
| 5,495,419 A | 2/1996 | Rostoker et al. | |
| 5,495,606 A | 2/1996 | Borden et al. | |
| 5,504,894 A | 4/1996 | Ferguson et al. | |
| 5,537,588 A | 7/1996 | Engelmann et al. | |
| 5,551,027 A | 8/1996 | Choy et al. | |
| 5,572,640 A | 11/1996 | Schettler | |
| 5,574,900 A | 11/1996 | Huang et al. | |
| 5,590,319 A | 12/1996 | Cohen et al. | |
| 5,642,515 A | 6/1997 | Jones et al. | |
| 5,671,403 A | 9/1997 | Shekita et al. | |
| 5,675,791 A | 10/1997 | Bhide et al. | |
| 5,680,547 A | 10/1997 | Chang | |
| 5,694,591 A | 12/1997 | Du et al. | |
| 5,710,915 A | 1/1998 | McElhiney | |
| 5,764,912 A | 6/1998 | Rosborough | |
| 5,765,150 A | 6/1998 | Burrows | |
| 5,787,251 A | 7/1998 | Hamilton et al. | |
| 5,794,227 A | 8/1998 | Brown | |
| 5,797,136 A | 8/1998 | Boyer et al. | |
| 5,822,748 A | 10/1998 | Cohen et al. | |
| 5,852,820 A | 12/1998 | Burrows | |
| 5,857,180 A | 1/1999 | Hallmark et al. | |
| 5,860,069 A | 1/1999 | Wright | |
| 5,875,445 A | 2/1999 | Antonshenkov | |
| 5,918,225 A | 6/1999 | White et al. | |
| 6,003,022 A | 12/1999 | Eberhard et al. | |
| 6,009,265 A | 12/1999 | Huang et al. | |
| 6,026,390 A | 2/2000 | Ross et al. | |
| 6,026,391 A | 2/2000 | Osborn et al. | |
| 6,026,394 A | 2/2000 | Tsuchida et al. | |
| 6,061,676 A | 5/2000 | Srivastava et al. | |
| 6,205,451 B1 | 3/2001 | Norcott et al. | |
| 6,289,335 B1 | 9/2001 | Downing et al. | |
| 6,298,342 B1 | 10/2001 | Graefe et al. | |
| 6,334,128 B1 | 12/2001 | Norcott et al. | |
| 6,339,768 B1 | 1/2002 | Leung et al. | |
| 6,353,826 B1 | 3/2002 | Seputi | |
| 6,356,889 B1 | 3/2002 | Lohman et al. | |
| 6,356,891 B1 | 3/2002 | Agrawal et al. | |
| 6,370,524 B1 | 4/2002 | Witkowski | |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,526,526 B1 | 2/2003 | Dong et al. | |
| 6,529,896 B1 | 3/2003 | Leung et al. | |
| 6,529,901 B1 | 3/2003 | Chaudhuri et al. | |
| 6,615,222 B2 | 9/2003 | Hornibrook et al. | |
| 6,684,203 B1 | 1/2004 | Waddington et al. | |
| 6,694,306 B1 | 2/2004 | Nishizawa et al. | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,985,904 B1 | 1/2006 | Kaluskar et al. | |
| 6,990,503 B1 | 1/2006 | Luo et al. | |
| 7,007,007 B2 | 2/2006 | Slutz | |
| 7,089,225 B2 | 8/2006 | Li et al. | |
| 7,155,428 B1 | 12/2006 | Brown et al. | |
| 7,185,000 B1 | 2/2007 | Brown et al. | |
| 7,246,108 B2 | 7/2007 | Ahmed | |
| 7,305,410 B2 * | 12/2007 | Skopec et al. | 1/1 |
| 7,363,289 B2 | 4/2008 | Chaudhuri et al. | |
| 7,383,247 B2 | 6/2008 | Li et al. | |
| 7,406,477 B2 * | 7/2008 | Farrar et al. | 1/1 |
| 7,499,907 B2 | 3/2009 | Brown et al. | |
| 7,747,606 B2 * | 6/2010 | Dageville et al. | 707/713 |
| 2001/0047372 A1 | 11/2001 | Gorelik et al. | |
| 2002/0038313 A1 | 3/2002 | Klein et al. | |
| 2002/0099521 A1 | 7/2002 | Yang et al. | |
| 2002/0138376 A1 | 9/2002 | Hinkle | |
| 2003/0033291 A1 | 2/2003 | Harris | |
| 2003/0065644 A1 * | 4/2003 | Horman et al. | 707/1 |
| 2003/0093408 A1 | 5/2003 | Brown et al. | |
| 2003/0115212 A1 | 6/2003 | Hornibrook et al. | |
| 2003/0135480 A1 | 7/2003 | Van Arsdale et al. | |
| 2003/0159136 A1 | 8/2003 | Huang et al. | |
| 2003/0182276 A1 * | 9/2003 | Bossman et al. | 707/3 |
| 2003/0212647 A1 | 11/2003 | Bangel et al. | |
| 2003/0212668 A1 | 11/2003 | Hinshaw et al. | |
| 2003/0229639 A1 | 12/2003 | Carlson et al. | |
| 2004/0015600 A1 | 1/2004 | Tiwary et al. | |
| 2004/0205062 A1 | 10/2004 | Brown et al. | |
| 2004/0220911 A1 | 11/2004 | Zuzarte et al. | |
| 2004/0244031 A1 | 12/2004 | Martinez | |
| 2005/0028134 A1 | 2/2005 | Zane et al. | |
| 2005/0055382 A1 | 3/2005 | Ferrat et al. | |
| 2005/0097091 A1 | 5/2005 | Ramacher et al. | |
| 2005/0120000 A1 | 6/2005 | Ziauddin et al. | |
| 2005/0125393 A1 | 6/2005 | Yagoub et al. | |
| 2005/0125427 A1 | 6/2005 | Dageville et al. | |
| 2005/0125452 A1 | 6/2005 | Ziauddin et al. | |
| 2005/0165741 A1 | 7/2005 | Gordon | |
| 2005/0177557 A1 | 8/2005 | Ziauddin et al. | |
| 2005/0177971 A1 | 8/2005 | Porco | |
| 2005/0187917 A1 | 8/2005 | Lawande et al. | |
| 2005/0187971 A1 * | 8/2005 | Hassan et al. | 707/104.1 |
| 2005/0198013 A1 | 9/2005 | Cunningham et al. | |
| 2005/0203933 A1 | 9/2005 | Chaudhuri et al. | |
| 2005/0203940 A1 | 9/2005 | Farrar et al. | |
| 2005/0234965 A1 | 10/2005 | Rozenshtein et al. | |
| 2005/0262060 A1 | 11/2005 | Rohwedder et al. | |
| 2005/0283471 A1 | 12/2005 | Ahmed | |
| 2006/0026115 A1 | 2/2006 | Ahmed | |
| 2006/0026133 A1 | 2/2006 | Ahmed | |
| 2006/0031200 A1 | 2/2006 | Santosuosso | |
| 2006/0041537 A1 | 2/2006 | Ahmed | |
| 2006/0129542 A1 | 6/2006 | Hinshaw et al. | |
| 2006/0195416 A1 | 8/2006 | Ewen et al. | |
| 2006/0212428 A1 | 9/2006 | Nelson | |
| 2007/0038595 A1 * | 2/2007 | Ghosh et al. | 707/2 |
| 2007/0061379 A1 | 3/2007 | Wong et al. | |
| 2007/0078825 A1 | 4/2007 | Bornhoevd et al. | |
| 2007/0083500 A1 | 4/2007 | Zibitsker | |
| 2008/0010240 A1 | 1/2008 | Zait | |
| 2008/0040196 A1 | 2/2008 | Coon et al. | |
| 2008/0052271 A1 | 2/2008 | Lam | |
| 2008/0077348 A1 | 3/2008 | Hildebrand et al. | |
| 2008/0098003 A1 | 4/2008 | Dias et al. | |
| 2008/0114718 A1 | 5/2008 | Anderson et al. | |
| 2008/0168058 A1 | 7/2008 | Gordon | |
| 2008/0178079 A1 | 7/2008 | Chen et al. | |
| 2008/0215536 A1 | 9/2008 | Day et al. | |
| 2008/0235183 A1 | 9/2008 | Draese et al. | |
| 2009/0006445 A1 | 1/2009 | Shemenzon et al. | |
| 2009/0018992 A1 * | 1/2009 | Zuzarte et al. | 707/2 |
| 2009/0037923 A1 | 2/2009 | Smith et al. | |
| 2009/0077016 A1 | 3/2009 | Belknap et al. | |
| 2009/0077017 A1 | 3/2009 | Belknap et al. | |
| 2009/0100004 A1 | 4/2009 | Andrei et al. | |

OTHER PUBLICATIONS

U.S. Appl. No. 12/188,975, filed Aug. 8, 2008, Office Action, Nov. 29, 2010.

U.S. Appl. No. 12/188,981, filed Aug. 8, 2008, Office Action, Nov. 23, 2010.

Ahmed, Rafi et al., "Cost-Based Query Transformation in Oracle," Copyright 2006 VLDB, ACM 1595933859, pp. 1026-1036.

Bello, Randall G. et al. "Materialized Views in Oracle," VLDB '98, Proceedings of 24th International Conference on Very Large Data Bases, Aug. 24-27, 1998, New York City, New York, USA, pp. 659-664.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference, 1998, pp. 339-350.

Borla-Salamet, Pascale, "Compiling Control into Database Queries for Parallel Execution Management," IEEE Conference on Parallel Distributed Information Systems, 1991, ISBN 0-8186-2295-4, pp. 271-279.

Chaudhuri, Surajit et al., "Including Group-By in Query Optimization," Proceedings of the 20th VLDB Conference—1994, pp. 354-366.

Chaudhuri, Surajit, "An Overview of Query Optimization in Relational Systems", Microsoft Research, 1998, 10 pages.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13th VLDB Conference, Brighton 1987, pp. 197-208.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Dewitt, et al., "A Performance Analysis of the Gamma Database Machine," Computer Sciences Department, University of Wisconsin, 1988, pp. 350-360.

Deutsch, Alin et al., "Minimization and Group-By Detection for Nested XQueries", University of California, San Diego, 2003, 15 pages.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 14 pages.

Galindo-Legaria, Cesar et al., "Outerjoin Simplification and Reordering for Query Optimization," ACM Transactions on Database Systems, vol. 22, No. 1, Mar. 1997, pp. 43-74.

Gopalkrishnan, Vivekanand, et al. "Issues of Object-Relational View Design in Data Warehousing Environment," IEEE 1998, 0780347781, pp. 2732-2737.

Graefe, Goetz, "Encapsulation of Parallelism in the Volcano Query Processing System," Mar. 1990, pp. 102-111.

Haydu, John, "Analytic SQL Features in Oracle9i", An Oracle Technical White Paper, Dec. 2001, 32 pages.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Kung, Chenho, "Object Subclass Hierarchy in SQL: A Simple Approach," Communications of the AC, Jul. 1990, vol. 33, No. 7, pp. 117-125.

Leverenz et al., "Oracle 8i Concepts Release 8.1.5-A67781-01", Oracle Corporation, Feb. 1999, located on the internet at <http://www.csee.umbc.edu/help/oracle8/server.815/a67781/toc.htm>, 121 pages.

Lumpkin, George et al., "Query Optimization in Oracle 9i", Oracle Corporation, Oracle White Paper, Feb. 2002, pp. 1-30.

Mishra, Priti et al., "Join Processing in Relational Databases," ACM Computing Surveys, vol. 24, No. 1, Mar. 1992, pp. 63-113.

Moro, Gianluca et al. "Incremental maintenance of multi-source views," Database Conference, 2001, ADC 2001, Proceedings, 12th Australasian, Jan. 2001, pp. 13-20.

Muralikrishna, M., "Improved Unnesting Algorithms for Join Aggregate SQL Queries", VLDB Conference, Canada, 1992, 12 pages.

Najjar, Faiza et al. "Cardinality estimation of distributed join queries," Sep. 1-3, 1999; Database and Expert Systems Applications, 1999, Proceedings, Tenth International Workshop on, pp. 66-70.

Oracle, "Optimizer Modes, Plan Stability, and Hints", Oracle8i Tuning Release 8.1.5 A67775-01, Oracle Website, 1999, 54 pages.

Oracle® Database Performance Tuning Guide 10g Release 2 (10.2) "Using Plan Stability" pp. 18-1 to 18-10, 10gR2 released Jul. 11, 2005, 11 pages.

Oracle® Database Performance Tuning Guide 10g Release 2 (10.2) "Automatic SQL Tuning", 10gR2 released Mar. 2008, 12 pages. http://download.oracle.com/docs/cd/B19306_01/server.102/b14211/sql_tune.htm#i22019.

Oracle® Database Performance Tuning Guide 10g Release 2 (10.2) "The Query Optimizer", 10gR2 released Mar. 2008, 33 pages. http://download.oracle.com/docs/cd/B19306_01/server.102/b14211/optimops.htm#i21299.

Oracle® Database Performance Tuning Guide 10g Release 2 (10.2) "Using Optimizer Hints", 10gR2 released Mar. 2008, 13 pages. http://download.oracle.com/docs/cd/B19306_01/server.102/b14211/hintsref.htm#i8327.

Oracle® Database Performance Tuning Guide 10g Release 2 (10.2) "Using Plan Stability", 10gR2 released Mar. 2008, 11 pages. http://download.oracle.com/docs/cd/B19306_01/server.102/b14211/outlines.htm#g35579.

Selinger, P. Griffiths, et al., "Access Path Selection in a Relational Database Management System", Proceedings of the 1979 ACM SIGMOD International Conference on the Management of Data, 1979, pp. 23-34.

Seshadri, Preveen, "Cost-Based Optimization for Magic: Algebra and Implementation," SIGMOND '96, 1996 ACM 0-89791-794-4, pp. 435-446.

Stonebraker, Michael, et al. "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

U.S. Appl. No. 12/188,662, filed Aug. 8, 2008, Office Action, Feb. 24, 2011.

U.S. Appl. No. 12/188,683, filed Aug. 8, 2008, Office Action, Mar. 30, 2011.

U.S. Appl. No. 12/188,981, filed Aug. 8, 2008, Office Action, Feb. 21, 2012.

U.S. Appl. No. 12/188,683, filed Aug. 8, 2008, Final Office Action, Sep. 27, 2011.

U.S. Appl. No. 12/188,678, filed Aug. 8, 2008, Final Office Action, Oct. 13, 2011.

U.S. Appl. No. 12/188,662, filed Aug. 8, 2008, Office Action, Jul. 13, 2011.

Pirahesh, H. et al., "Extensible/Rule Based Query Rewrite Optimization in Starburst" dated Jun. 1992, *ACM Sigmod* (10 pages).

U.S. Appl. No. 12/188,975, filed Aug. 8, 2008, Final Office Action.

U.S. Appl. No. 12/188,975, filed Aug. 8, 2008, Non Final Office Action, Dec. 21, 2011.

\* cited by examiner

MAINTAINING AND UTILIZING SQL EXECUTION PLAN HISTORIES

PRIORITY CLAIM

This application claims the benefit under 35 U.S.C. 119(e) of provisional Application No. 60/980,710, filed Oct. 17, 2007, the entire contents of which are hereby incorporated by reference for all purposes as if fully set forth herein.

CROSS-REFERENCE TO RELATED APPLICATIONS

This application is related to U.S. Patent Application No. 12/188,662, filed Aug. 8, 2008, entitled "Automatic Recognition and Capture of SQL Execution Plans," by Dageville et al., the entire contents of which are hereby incorporated by reference for all purposes as if fully set forth herein.

This application is related to U.S. Patent Application No. 12/188,678, filed Aug. 8, 2008, entitled "SQL Execution Plan Baselines," by Das, et al., the entire contents of which are hereby incorporated by reference for all purposes as if fully set forth herein.

This application is related to U.S. Patent Application No. 12/188,683, filed Aug. 8, 2008, entitled "SQL Execution Plan Verification," by Belknap, et al., the entire contents of which are hereby incorporated by reference for all purposes as if fully set forth herein.

FIELD OF THE INVENTION

Embodiments of the invention described herein relate generally to database systems and, more specifically, to techniques for maintaining a history of query plans executed for a database command.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various steps discussed in this section and throughout this application may be performed by either database administrators or database users. This application does not attempt to differentiate between the two types of individuals. Therefore, any step said to be performed by either a "user" or "administrator" may also be performed by both a user and an administrator. Furthermore, many of the steps that are said to be performed by a user or administrator may also be performed by database application programmed by a user or administrator, while any step said to be performed by a database application may also be performed manually by a user or administrator.

Database Commands

Database applications interact with a database server by submitting to the database server commands that cause the database server to perform operations on data stored in a database. A database command that is sent from a database application to a database server contains the statement or text of the database command. Thus, database commands may also be referred to as database statements. Database commands include database queries.

For the database server to process database commands, the commands must conform to a database language supported by the database server. One database language supported by many database servers is known as the Structured Query Language (SQL). A database command submitted in this language is known as SQL query.

When a database server receives a database command from a database application, the database server must determine which actions should be performed in response to the database command. The database server must then perform those actions. The act of preparing for performance of those actions is generally referred to as "compiling" the database command, while performing those actions is generally referred to as "executing" the database command.

Query Plans

As part of the compilation process for a database command, a database server typically creates or identifies a "query plan" for executing the database command. A query plan is a data structure that represents a series of steps or actions which, when executed by the database server, accomplish the operation or operations indicated in a database command. A query plan may also be known as an "execution plan."

There are typically a large number of alternative ways to execute a given database command. Thus, for any database command, there may be a large number of alternative query plans that the database server may execute.

While all producing the same correct results, each of these alternative query plans for a given query may have widely varying performance. Performance may depend on factors such as object statistics, database configuration, hardware configuration, compilation and execution environment parameters, bind variable values, database user profiles, and the number of concurrent database users. Together, these and other performance-effecting factors may be referred to as the "execution context" of a database server. When any of these factors change, the performance of each alternative query plan may change as well.

A query plan may be represented in a variety of ways. One method of representing a query plan is a row-source tree. The row-source tree representation of execution plans is described in detail in U.S. Pat. No. 5,857,180, entitled "Method and apparatus for implementing parallel operations in a database management system", issued to Hallmark et al. on Jan. 5, 1999, the entire contents of which are incorporated by reference herein.

Query Optimizer

It is advantageous for a database server to execute a database command using a query plan that performs relatively quickly or efficiently compared to other alternative query plans for executing the database command. Such a query plan may be referred to as an optimal query plan.

To identify an optimal query plan, a database server typically relies upon a component known as a "query optimizer." The query optimizer identifies a number of alternative query plans for executing a given database statement. Then, the query optimizer selects one of these alternative query plans to return to the database server for execution. Conventionally, the query optimizer selects the one plan among the identified alternatives that it considers most optimal for the current execution context.

More specifically, the query optimizer utilizes various rules and information to determine a number of different alternative query plans that will correctly perform the operations indicated by a database command. Then, the query optimizer analyzes each of the alternative query plans to predict the costs of executing the database command according to that query plan. For a given query plan, the predicted cost analysis comprises, among other elements, estimating the cost of performing each step in the sequence of steps specified in the given query plan. The cost estimates for the steps are determined based on the current execution context (i.e. the state of the execution context at the time the cost estimation operations are being performed).

Once the cost estimates are completed for all alternative queries, the query optimizer selects the optimal query plans by determining which of the query plans involves the sequence of steps with the lowest total predicted costs. For purposes of this application, an optimal query plan is a query plan whose costs, relative to the costs of other query plans in a group of identified query plans, best meet criteria of optimality established for the database server. Thus, the term "optimal" may have different meanings depending on which types of costs are considered and how those costs are weighed.

Criteria identifying costs to be considered in judging optimality, as well as the weightings for those costs, may be defined in the code of the database server or configured by administrators of the database server. Costs criteria may include a variety of factors, including speed and resource usage. For example, some database server configurations may weigh a query plan that performs quickly as more optimal than one that uses less memory, while other database server configurations may prefer alternative cost weightings for judging optimality. A query plan whose costs meet criteria of optimality established for the database server better than the costs of other query plans is said to have "lower costs" or "lower total cost" than the other query plans.

Ad-Hoc and Repeatable Commands

Typically, the vast majority of database commands executed by a database server are "ad hoc" commands, in that they are not likely to be executed again. However, certain database commands are repeated relatively frequently. These database commands may be referred to as "repeatable" commands. Although they are frequently utilized by reporting, form-generating, or business-flow logic applications, they can occur in a variety of different contexts.

Query Optimizer Inefficiencies

As explained above, when generating and selecting query plans, query optimizers typically rely upon predictive cost-based techniques for determining which of the identified query plans for a database command will result in the best performance. However, there are inherent uncertainties in the query optimizer's predictive analysis. For example, to predict the costs for any given step of a query plan, the query optimizer typically utilizes certain limited statistics about data in the accessed database. Basing the costs on such limited statistics may result in errors based on, for example, erroneous cost and cardinality estimations. Consequentially, the predicted performance of a query plan may sometimes be significantly different than its actual performance, leading the query optimizer to error in identifying which query plan will have the best performance for a database command.

For example, a query optimizer may identify plans A and B as capable of accomplishing the operations indicated by a certain database command. The query optimizer may predict that plan A is the better plan. However, in actuality, plan B may perform the operations more efficiently than plan A. Nonetheless, because the query optimizer's determination of an optimal plan is based on predicted performance, the query optimizer will pick the less efficient plan A for executing the database command.

For purposes of this application, a query plan that is predicted to be the most optimal plan in a group of query plans is said to be a "predicted optimal" or "predicted lowest cost" plan, while the other plans in the group of plans are said to be "predicted suboptimal" plans. A query plan that actually performs better than any other plan in a group of plans is known as the "actually optimal" plan, while other plans in the group of plans are considered "actually suboptimal" plans.

Profiles

One method for dealing with the above described inefficiencies is query tuning. A database server may store "profiles" for certain database commands. These profiles comprise tuning information that assists the query optimizer in making better decisions about the operations it may use to execute a database command. For example, this tuning information may have been generated as part of an automated tuning process that compares the optimizer's predicted costs for a particular step of a query plan against the actual cost of taking that step. The tuning information stored in the profile may include directives that cause the query optimizer to compensate for the estimation error.

A database administrator may sometimes be able to fine-tune query plan generation by identifying preferences for steps that the query optimizer may take during query plan. The administrator may consider these preferences likely to lead to a query plan with better actual performance. The administrator may generate and store tuning information describing these preferences in the profile for the database command.

One technique for implementing profiles is discussed in U.S. Patent Publication Number 2005/0125452 by Ziauddin et al., entitled "SQL Profiles" and published Jun. 9, 2005, the entire contents of which are incorporated by reference herein. One technique for generating, storing, and utilizing profiles is a database component known as a SQL Tuning Base (STB). STBs are described in U.S. Patent Publication Number 2005/0097091 by Ramacher et al., entitled "SQL Tuning Base" and published May 5, 2005, the entire contents of which are incorporated by reference herein.

Stored Outlines

Another method for dealing with the above described inefficiencies is "stored outlines."Database servers may generate and store representations of query plans known as "outlines." An outline comprises a set of hints or optimizer directives that indicate steps and step sequences previously decided upon by the query optimizer in generating the query plan for a particular database statement. The hints stored within an outline are typically sufficient enough that, based on them, a query optimizer will typically generate the same query plan for the database statement as was generated when the query optimizer made the outline. Outlines are described in greater detail in both "SQL Tuning Base" and U.S. Patent Publication Number 2007/0038595 by Ghosh et al., entitled "Query processing in a parallel single cursor model on multi-instance configurations, using hints" and published Feb. 15, 2007, the entire contents of which are incorporated by reference herein.

One way in which outlines may be useful is that they allow for the "freezing" of a query plan for a database command. Since predicted query plan performance changes based on the execution context for the database server, a query optimizer may select a different query plan every time the execution context changes. Rather than risk that the database server will utilize a new, predicted optimal but actually suboptimal plan, a database administrator may create a "stored outline" for a particular plan. The particular plan is one that the administrator identifies as most likely to be actually optimal. Because of the stored outline, the query optimizer will typically only generate a plan that follows the outline. Thus, the stored outline ensures that the query optimizer will most likely generate and select the particular plan. In so doing, the stored outline ensures performance stability for the database statement even when the execution context is altered in the course of upgrades, database changes, and so on.

Problems with the Present Approaches

Unfortunately, query tuning and stored outlines share a number of drawbacks. One of these drawbacks is that both approaches rely on a database administrator to identify the database commands for which the database server should store profiles or stored outlines. In other words, the database administrator must identify which database commands are likely to be worth the effort of tuning or storing an outline.

Another drawback with stored outlines is that the database administrator is typically responsible for selecting which query plans to use as the basis of the stored outlines. If the database administrator creates a stored outline for an actually suboptimal plan, use of the stored outline may actually degrade the performance of the system To pick the query plans for which the create stored outlines, the database administrator typically must engage in trial-and-error testing, or possess a detailed knowledge of the database system in which a command is to be executed.

Furthermore, even though a query plan generated using a stored outline or profile may have been actually optimal for one execution context, the query plan may be suboptimal for other execution contexts. The performance degradation resulting from continued use of such a query plan after a change in the execution context is a common reason for users to hesitate in upgrading or reconfiguring database systems. By freezing the query plan, or by tuning the query optimizer to one execution context, both profiles and stored outlines limit flexibility in responding to changes to the execution context, even when those changes are major. In other words, while stored outlines and profiles offer stable, fine-tuned query plans for a database command, those benefits come at the expense of compromising the query optimizer's ability to generate potentially better query plans upon changes to the execution context.

For these and other reasons, it is desirable to provide database administrators greater control over and information about query plan generation, selection, and execution. For instance, it is desirable to provide mechanisms whereby query plan stability may be provided with minimal impact on a query optimizer's ability to respond with potentially better query plans upon changes in the execution context.

Also, it is desirable to provide mechanisms for assisting an administrator in identifying database commands for which actions might be taken to assist the database server in generating better query plans.

Also, it is desirable to provide both query optimizers and database administrators with increased information upon which to make decisions regarding query plan generation and selection, resource scheduling, server configuration, and many other database-related tasks.

BRIEF DESCRIPTION OF THE DRAWINGS

The present invention is illustrated by way of example, and not by way of limitation, in the figures of the accompanying drawings, and in which like-reference numerals refer to similar elements, and in which.

DETAILED DESCRIPTION

Figure 1:
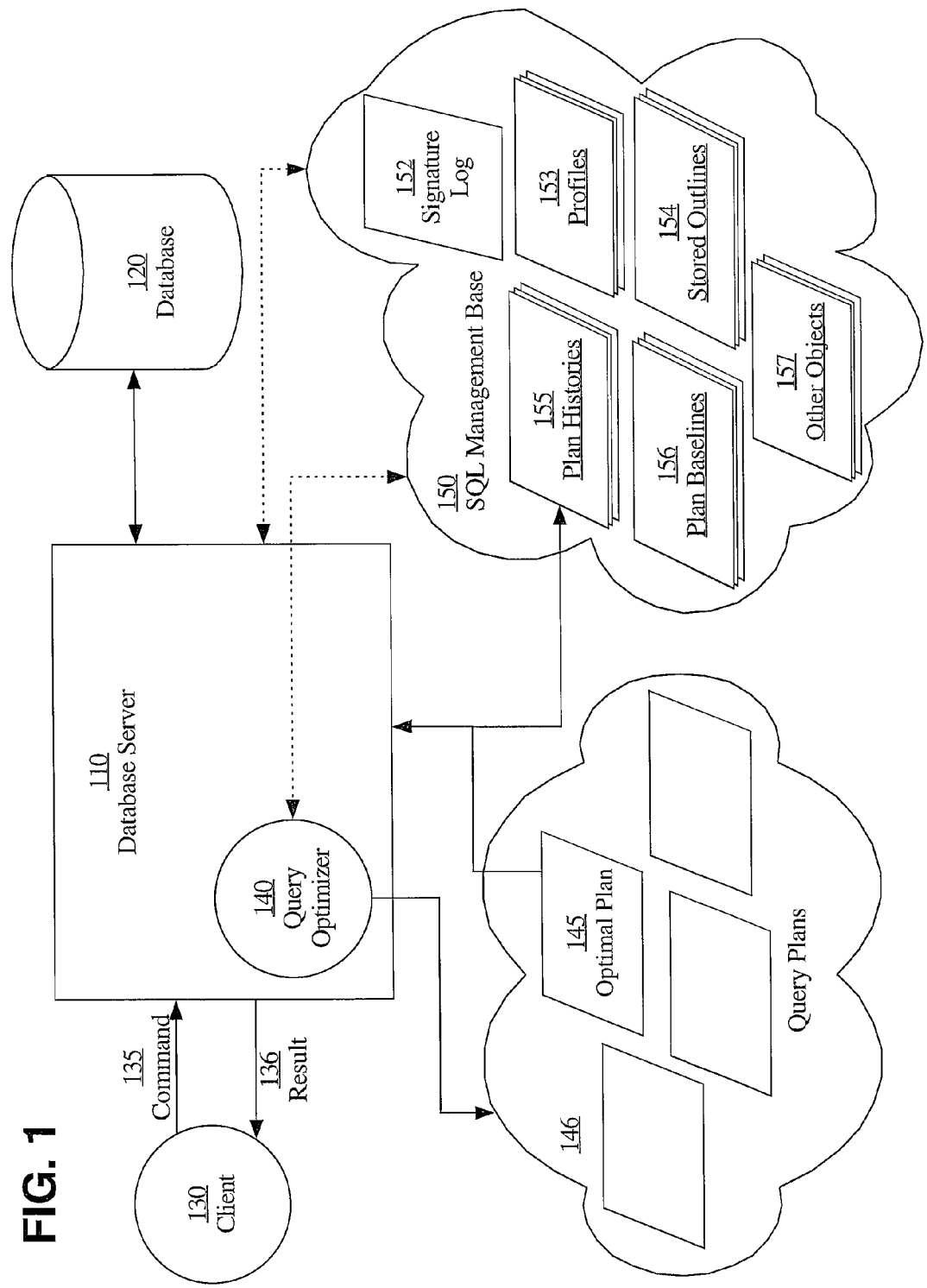
FIG. 1 is a block diagram that illustrates a database system 100 in which an embodiment of the invention may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Also, in the following description, for the purposes of explanation, numerous process flows are provided for various embodiments of the invention. The process flows are exemplary only. Other embodiments of the invention may achieve similar results by using variations on the described steps, following alternative sequences of steps, or even omitting certain steps.

Embodiments are described herein according to the following outline:

1.0. General Overview
    2.0. Structural Overview
    3.0. Functional Overview
        3.1. Automatically Capturing Information for Repeatable Commands
        3.2. Plan Histories
        3.3. Utilizing Captured Information and Plan Histories
        3.4. Plan Baselines
        3.5. Query Plan Verification
        3.6. Plan Baseline Evolution
    4.0. Implementation Mechanism-Hardware Overview
    5.0. Extensions and Alternatives

1.0. General Overview

Approaches, techniques, and mechanisms are disclosed for capturing data related to query plans and increasing the efficiency with which database commands are executed in a database system.

According to one embodiment, a database server may automatically identify and store information about database commands for which actions may be taken to assist the database server in generating better query plans. The database server is configured to capture information related to the execution of database commands that exhibit interesting characteristics. The database server receives a first request to execute a first command. The database server executes the first command according to the first plan. In response to determining that the first command matches one or more pre-defined criteria, the database server persistently records captured information related to the execution of the first command according to the first plan. The criteria may include, for example, whether or not the command is repeatable, the existence of bind variables, access by the database command of a particular object, high resource utilization, or receipt from a particular user, client, or application. The information recorded may include, for example, performance statistics collected during execution of the first plan, data indicating the execution context during execution of the first plan, and properties of the first plan. Subsequently, the database server receives a second request to execute a second command. In response to the second request, the database server determines that the second command is equivalent to the first command. In response, the database server executes the second command in a manner that is based, at least in part, on the information related to the execution of the first command.

According to an embodiment, the database server records information related to the first command, as described above. The information is then reported to a user. Based on the information, the user may perform various actions, such as maintenance, tuning, or configuration tasks.

According to an embodiment, the database server makes available increased information related to the execution of query plans by maintaining a history of the plans used to execute a database command, as well as information related to those plans. The database server receives a request to execute a particular command. The database server determines a plan for executing the particular command. The database server adds information related to the plan to a plan history associated with the particular command. The plan history comprises information related to a plurality of plans that have been generated for the particular command. The information related to the plan may include, for example, properties of the plan, an outline of the plan, and statistics collected during execution of the plan.

According to an embodiment, the database server implements a technique for refreshing the information in a plan history. The database server persistently maintains historical information related to one or more plans for executing a particular command. The database server determines that historical information related to a particular plan of the one or more plans is out-of-date. While executing the particular plan, the database server captures information related to the execution of the particular plan. Based on the captured information, the database server modifies the historical information related to the particular plan.

According to an embodiment, the database server implements a technique for purging older or less important information in a plan history. The database server persistently maintains historical information related to one or more plans for executing one or more particular commands. For each of the one or more plans, the historical information comprises one or more particular attributes. The database server generates a ranked list of plans by, for each of the one or more plans, ranking the plan based on the one or more particular attributes for the plan. The database server performs one or more actions based on the ranked list of plans. For example, the database server may delete low ranking plans based on space constraints. As another example, the database server may delete plans that have not been executed since a particular time (e.g. older than a year).

According to an embodiment, a database server utilizes a plan baseline as a compromise between stability and flexibility in selecting a query plan for executing a database command. Except in rare circumstances, the database server may only execute a database command according to a plan found in a set of baseline plans for the database command, even if the database server predicts that a different plan has a lower cost. The set of baseline plans are plans that, for one reason or another, have been determined to provide acceptable actual performance in at least one execution context. The database server persistently maintains, for a particular command, baseline data indicating the set of acceptable plans for executing the particular command. The database server receives a first request to execute the particular command. The database server estimates, for each plan in the plurality of acceptable plans, predicted costs for satisfying the first request according to the plan. Based on the predicted costs for each plan in the plurality of acceptable plans, the database server selects a particular plan from the set of acceptable plans. In response to the first request to execute the particular command, the database server executes the particular command according to the particular plan.

According to an embodiment, the database server may evolve the plan baseline by generating new plans in response to receiving a request to execute a command. The database server persistently maintains, for a particular command, baseline data indicating a plurality of acceptable plans for executing the particular command. The database server receives a first request to execute the particular command. The database server generates a first plan for executing the particular command. If the first plan is in the plurality of acceptable plans, the database server executes the particular command according to the first plan. However, if the first plan is not in the plurality of acceptable plans, the database server executes the particular command according to a plan in the plurality of acceptable plans. The database server then adds the first plan to a list of potentially acceptable plans. Subsequent to executing the particular command and adding the first plan to the list of potentially acceptable plans, the database server adds the plan to the plurality of acceptable plans. The database server may, for example, add the plan in response to an automatic verification process, a tuning process, or user input.

According to an embodiment, the database server may also evolve the plan baseline by means of a query optimization or tuning process. The database server persistently maintains, for a particular command, baseline data indicating a plurality of acceptable plans for executing the particular command. During a query optimization process for the current execution context, the database server is asked to store profile data for the particular database command. In response to this request, the database server determines a plan for executing the particular command in the current execution context. This determination of a plan is based on the profile data. The database server then adds, to the baseline data, data indicating the determined plan.

According to an embodiment, a database server utilizes query verification techniques as a compromise between stability and flexibility in selecting a query plan for executing a database command. Except in rare circumstances, a query plan is not executed unless it is first verified by the database server. The database server receives a first request to execute a database command. The database server determines a first plan for satisfying the first request to execute the database command, but the first plan is an unverified plan. The database server instead satisfies the first request by executing the database command according to a verified plan. Subsequent to satisfying the first request-for example as part of a periodically scheduled job-the database server executes the first plan to determine performance statistics for the first plan. Based at least on the performance statistics, the database server determines to verify the first plan. Subsequent to verifying the first execution plan, the database server receives a second request to execute the database command. The database server satisfies the second request by executing the database command according to the first plan, which is now verified.

According to an embodiment, verification of an unverified plan occurs concurrently with executing the database command according to a verified plan. The database server receives a first request to execute a database command. The database server determines a first plan for executing the database command, but the first plan is an unverified plan. In response to the first request, the database server executes the database command according to the first plan. Concurrently, the database server executes the database command according to a verified plan. If the first plan completes before the verified plan, the database server verifies the first plan.

According to an embodiment, the database server optimistically assumes that newly generated plans will be acceptable, and therefore utilizes newly generated plans for a preliminary period until it can determine whether or not the plan is actually acceptable. The database server receives a first request to execute a database command. The database server determines a first plan for satisfying the first request to execute the database command. The database server determines that the first plan is a new plan, for which no verification data is maintained. The database server satisfies the first request by executing the database command according to the first plan. The database server collects performance statistics for the first plan. Based at least on the performance statistics, the database server determines to store verification data for the first plan indicating that the first plan is unacceptable. Subsequently, the database server receives a second request to execute the database command. The database server determines a second plan for satisfying the second request to execute the database command, the second plan being equivalent to the first plan. The database server instead satisfies the second request by executing the database command according to a verified, acceptable plan.

In other aspects, the invention encompasses a computer apparatus and a computer-readable medium configured to carry out the foregoing steps.

2.0. Structural Overview

FIG. 1 is a block diagram that illustrates a database system 100 in which an embodiment of the invention may be practiced. Database system 100 comprises a database server 110 coupled to a database 120. Database system 100 may also comprise other database servers and databases.

Database server 110 is communicatively coupled to a client 130. Client 130 may be, for example, a database application that requires access to data in database 120. Client 130 accesses the data in database 120 by sending database commands, such as database command 135, to database server 110. Database command 135 may be in any language or form capable of indicating operations to be performed with respect to the data in database 120. For example, database command 135 may be an SQL statement or query.

In response to receiving database command 135, database server 110 executes one or more operations indicated by database command 135. These operations may, for example, write or modify data in database 120. These operations may also request data to be read from database 120. Based on the results of the executed operations, database server 110 may return a result 136 to client 130. Result 136 may be in a variety of forms. For example, result 136 may be an SQL result set.

Query Optimizer

Prior to executing the operations indicated by database command 135, database server 110 generates or identifies a query plan 145 for database command 135. Database server 110 may generate query plan 145 by, for example, communicating database command 135 to a query optimizer 140 for processing. In some embodiments, database server 110 may not feature a query optimizer 140. In such cases, database server 110 may feature other components that perform some or all of the functions subsequently described as being performed by the query optimizer 140.

Query optimizer 140 may analyze database command 135 to generate or identify one or more query plans 146, each of which comprise data indicating steps or actions database server 110 may perform to correctly execute the one or more operations indicated by database command 135. From these query plans, query optimizer 140 may select one of query plans 146—in this case, query plan 145—for execution by the database server. Once query optimizer 140 has selected query plan 145, it communicates query plan 145 to database server 110.

Conventionally, as part of this process, query optimizer determines which of query plans 146 is most optimal using a predicted costs based analysis. This analysis may be based on any one or combination of factors from the current execution context for database server 110. Conventionally, the query plan predicted to be most optimal is selected as query plan 145. However, according to embodiments of the invention, selection may be based partly or exclusively on other factors described in this application, including plan baselines and verification status.

SQL Management Base

Database server 110 may feature an SQL Management Base (SMB) 150. SMB 150 may be stored or represented in a variety of forms. For example, according to an embodiment, SMB 150 is part of a data dictionary for the database system, stored as a separate schema in a system or system auxiliary tablespace utilized by database server 110.

According to an embodiment, SMB 150 stores a statement log 152. Statement log 152 comprises identifiers indicating a number of database commands. These database commands may be, for example, database commands previously evaluated by query optimizer 140 over a certain period of time. According to an embodiment, the statement log 152 may be used in identifying a database command as repeatable, as discussed in section 3.1 of this description.

According to an embodiment, SMB 150 stores a number of SQL Management Objects (SMOs) 153-154, 156, and 157. Profiles 153 and stored outlines 154 are examples of types of SMOs stored in SMB 150. Each profile 153 and stored outline 154 may be associated with a different database command.

According to an embodiment, SMB 150 also comprises information related to query plans that have been executed on database server 110. SMB 150 may store this information in the form of plan histories 155. According to an embodiment, SMB 150 may store plan histories for each repeatable database command processed by database server 110. For example, as database server 110 receives a database command 135 that is not in statement log 152, database server 110 may utilize certain criteria to determine whether or not database command 135 is repeatable. If so, database server may record a plan history 155 for the database command.

According to an embodiment, SMB 150 may comprise plan histories 155 for other database commands as well, such as database commands specifically identified by a database administrator. According to an embodiment, SMB 150 may comprise plan histories 155 for all database commands received by database server 110 over a certain period of time.

Each plan history 155 may include a variety of information, including a history of query plans that have been generated for its associated database command, which of those query plans have actually been executed, properties of each query plan, and performance information about the executed query plans. The contents of a plan history are further discussed in section 3.2.

According to an embodiment, query optimizer 140 may "look up" database command 135 in SMB 150 to determine whether or not a plan history 155 exists for database command 135. If a plan history 155 does exist for database command 135, query optimizer 140 may utilize information from this plan history 155 while generating query plans 146. Query optimizer 140 may also utilize information from this plan history 155 when selecting between query plans 146 to identify query plan 145. Utilization of information in a plan history is discussed in section 3.3.

According to an embodiment, plan baselines 156 are another type of SMO stored in SMB 150. Each plan baseline 156 is associated with a different database command. For that database command, each plan baseline indicates a set of query plans. Each query plan indicated by a plan baseline 156 (and therefore said to be "in" the plan baseline) is a plan that, for at least one execution context, has been determined to be acceptable to use for its associated database command. According to one embodiment, each plan in the plan baseline for a database command has been determined to be actually optimal for the database command in at least one execution context.

When asked to return a query plan for a database command in a current execution context, query optimizer 140 may utilize the plan baseline information for that database command in SMB 150. Query optimizer 140 may, rather than select a query plan that it has generated, calculate the predicted costs of the baseline plans in the current execution context, and then select the lowest-cost plan from plan baseline 156. Use and management of plan baselines is further discussed in section 3.4.

According to an embodiment, the plans in plan baseline 156 may be identified manually by an administrator. According to an embodiment, new plans generated by query optimizer 140 may later become part of a plan baseline 156 through a plan baseline evolution process. Plan baseline evolution is discussed in section 3.6.

According to an embodiment, SMB 150 stores verification data indicating whether or not certain query plans are verified. This verification information may be stored in a variety of forms, including as part of a plan baseline 156 or a plan history 155. Query optimizer 140 may utilize verification data from SMB 150 in determining whether or not to select a query plan that it has generated for a particular database command.

According to an embodiment, unless no correct verified query plan exists for the particular database command, query optimizer 140 may only select a query plan that has been verified. Query optimizer 140 may generate and select a predicted optimal plan for database command 135 as normal. However, if the predicted optimal plan is not verified for database command 135, query optimizer 140 will attempt to use a verified query plan instead.

Query plans may be verified in a number of ways. For example, a background process running in database system 100 may periodically execute query plans to determine if their actual performance meets certain criteria. As another example, an administrator may mark a plan as verified through an administrative or query tuning interface. Query verification is further discussed in section 3.5.

According to an embodiment, SMB 150 may also store other types of SMOs 157. According to an embodiment, some or all of SMOs 153-157 may be stored in structures and tables other than SMB 150.

Execution of a Query Plan

After query plan 145 has been generated or identified, database server 110 executes database command 135 according to query plan 145. In some embodiments, database server 110 may rely on other database servers to execute, in parallel, some or all of the steps of query plan 145.

Execution of database command 135 may, in some cases, produce a result that may be returned to the client in the form of result 136. This result may be, for example, a status indicator or an error message. This result may also be a result set comprising data that has been read from database 120.

According to an embodiment of the invention, database server 110 monitors the execution of database command 135 to capture information related to the performance of query plan 145. If database command 135 has been identified as repeatable, database server 110 may record various information related to the execution of query plan 145, such as the speed with which query plan 145 was executed, the amount of memory used by query plan 145, the value of bind variables used during execution of query plan 145, and so on. Database server 110 may record this information in SMB 150—for example, in a plan history 155. In addition to helping the query optimizer 140 generate and select a query plan for future requests to perform database command 135, this captured information might also be used for a variety of other purposes, such as to generate performance statistics or tuning information for database command 135.

Alternative Embodiments

In the foregoing description, and throughout this application, for purposes of simplification, certain functions are discussed as being performed by certain components of database server 110. However, these functions may instead be performed by other components of database server 110. Other functions are described as being performed in general by database server 110. Database server 110 may rely on any of the components described above to perform these functions, or database server 110 may feature other unspecified components for performing these functions.

For example, the functions of determining whether a database command is repeatable and capturing information about the database command are often described as being performed by a database server. However, these functions might more specifically be performed by a query optimizer on the database server.

3.0. Functional Overview

3.1. Automatically Capturing Information for Repeatable Commands

According to an embodiment of the invention, database commands are classified as either ad hoc or repeatable. Generally speaking, an ad hoc database command is one that, to best available knowledge, is likely to be executed relatively infrequently over a certain amount of time. Ad hoc database commands are typically issued just once by a client. By contrast, a repeatable database command is one that is likely to be executed relatively frequently within a certain amount of time. According to this embodiment, a database server may automatically capture information related to the execution of query plans for repeatable database commands.

Figure 2:
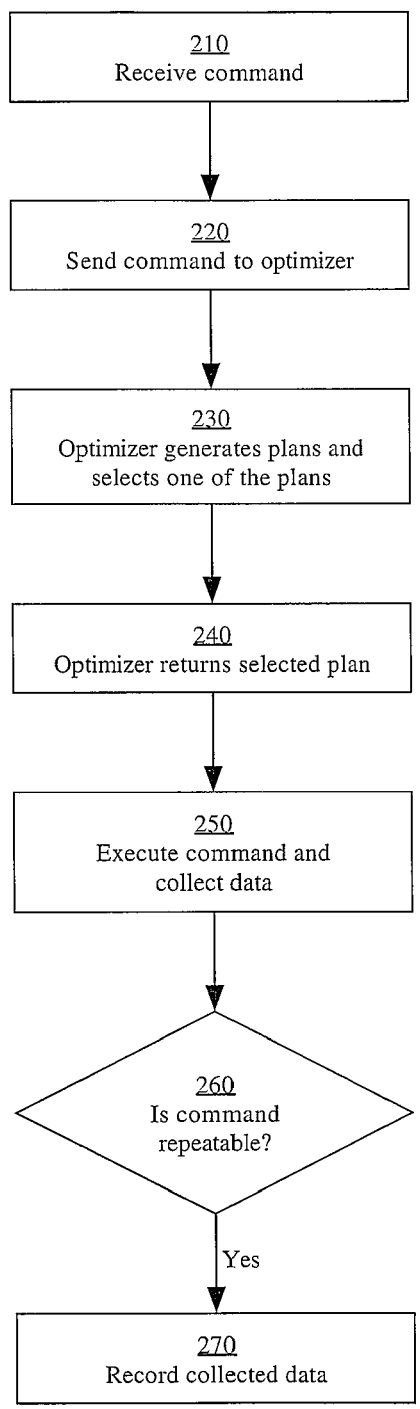
FIG. 2 illustrates a process flow 200 for identifying repeatable database commands and automatically capturing information related to the execution of those commands, according to an embodiment of the invention.

FIG. 2 illustrates a process flow 200 for identifying repeatable database commands and automatically capturing information related to the execution of those commands, according to an embodiment of the invention.

At step 210 a database server, such as database server 110, receives a request to execute a database command, such as database command 135.

At step 220, the database server sends the command to a query optimizer, such as query optimizer 140, so that the query optimizer may identify a query plan for executing the database command.

At step 230, the query optimizer evaluates the database command and generates one or more possible query plans for executing the database command. The query optimizer selects one of the generated query plans for execution by the database server.

At step 240, the query optimizer returns a query plan for the database command.

At step 250, the database server executes the database command using the returned query plan. According to an embodiment, while executing the query plan, the database server collects various data related to the execution of the query plan, the nature of which shall be shortly discussed.

Identifying a Command as Repeatable

At step 260, the database server determines whether or not the received database command is a repeatable database command. Each database server may be configured to perform this classification differently, using any one or combination of criteria for determining the likelihood of repeatability. These criteria may be hard-coded into the database server, or established by an administrator.

According to an embodiment, one criterion for establishing a likelihood of repeatability is whether or not the database server has previously captured and stored information related to the execution of a query plan for the database command. For example, the database server may attempt to locate the text of the command in data that has been stored as a result of performing step 270 with respect to previously received database commands. If that data comprises information associated with the text of the current database command, the database server may assume that the database command is repeatable.

According to an embodiment, another criterion for establishing a likelihood of repeatability is whether or not the database server has a record of previously receiving a request to perform the same database command. For example, the database server may persistently maintain a list indicating database commands that it has previously executed. This list may be, for example, in the form of statement log 152. The statement log may indicate each command by its original text, or the list may indicate each command using a more compact identifier, calculated from either the original text of the command, or the selected query plan. According to an embodiment, the identifier in the statement log may be a signature, as discussed in "Query processing in a parallel single cursor model on multi-instance configurations, using hints," as well as U.S. Pat. No. 6,839,724, to Manchanda, et. al, entitled "Metamodel-based metadata change management" and issued Jan. 4, 2005, the entire contents of which are incorporated by reference herein. However, the identifier may take other forms.

While the technique for producing identifiers for the statement log may be one that guarantees a unique identifier for each database command, the technique need not necessarily guarantee uniqueness. For example, the identifier may be computed using a hash function that has a very high likelihood of producing a different identifier for each database command received by a database server. Hence, even though two different database commands may occasionally have the same identifier, and thus may be mistakenly identified as repeatable, the rarity of such occurrences minimizes any adverse effects resulting from use the algorithm.

In a system that maintains a list of previously-executed commands, the list is used to identify commands that satisfy recurrence criteria. Those that satisfy recurrence criteria are established as repeatable commands, while other commands are not. For example, in one system, the recurrence criteria may be that the same query is received more than once. In such a system, the first time a query is received, the list is checked to see if an identifier for the query is already on the list. In response to determining that an identifier for the query is not already on the list, an identifier for the query may be placed on the list. Consequently, the second time the query is received, the identifier for the query will be found when the list is checked. In response to finding the identifier for the query on the list, the query may be established as a repeatable query.

The actual criteria that are used to determine whether a query is repeatable may vary from implementation to implementation. For example, in one system the criteria may be that the query was received five times within the last seven days. In such a system, a count may be maintained for each query identifier in the list. The count is incremented each time the query is received, and decremented seven days after each time the query is received. In response to the count reaching five, the query is established as a repeatable query.

According to an embodiment, other criteria for establishing a likelihood of repeatability may include the existence of bind variables in the database command, designation of the database command as "mission critical," receipt of the command from a certain user, client, or application (e.g. one which has been designated as being associated with repeatable commands), access of certain databases or objects, and so on. Each of these criteria may be used alone or in combination with any other criteria.

Capturing Information for Repeatable Commands

At step 270, for database commands that have been identified as repeatable in step 260, the database server may automatically record information related to the execution of the query plan for that database command. According to an embodiment, this capturing of information entails recording the data collected by the database server while executing the database command in step 250. Information, related to the execution of a query, which is captured in this manner, is referred to herein as "captured information" for the query.

The captured information may be stored in any table, database, or repository available to the database server. For example, the captured information may be stored in a plan history, as described in section 3.2, or an SMO 157 of SMB 150. In one embodiment, the captured information for a database command includes:
- outlines for the query plans generated by the query optimizer,
- an indication of the particular query plan used to execute the database command,
- the text of the database command,
- plan execution statistics, such as execution time, processor usage, and input/output usage, compilation environment, bind variable values, session settings, system configuration parameters, and any other interesting properties of the current execution context.

According to an embodiment, step 260 may be executed prior to step 250. A determination that a database command is repeatable in step 260 may trigger one or more information capture mechanisms during the execution of the query plan for the database command, which information may be subsequently recorded in step 270.

Selective Capture of Information for Repeatable Commands

According to an embodiment, the database server employs additional filters before deciding to capture information for a repeatable command in step 270. Thus, the database server may not always capture information related to repeatable commands.

For example, an administrator may only wish to capture information for more resource-intensive repeatable database commands. Thus, the administrator may configure the database server to, before capturing information (or adding the command to the statement log), determine if one or a combination of various indicators for resource utilization (e.g. elapsed time, processor usage) cross some pre-defined threshold during execution of the database command. Information is only captured if the various indicator or indicators cross the predefined threshold.

As another example, the administrator may configure the database server to capture information only for repeatable commands that access certain user-defined objects, such as certain databases, tables or indexes. As another example, the administrator may configure the database server to capture information only for repeatable commands that have an important business function for an application. As another example, the administrator may configure the database server to capture information only for repeatable commands issued from a particular user, client, or application. The issuing user, client, or application may be determined from the session state.

According to an embodiment, once information has been captured for a database command, the database server may continue to capture information for subsequent executions of the database command, even if the database command subsequently fails to satisfy a requisite additional filter.

Capturing Information without Regard to the Repeatability of the Commands

According to an embodiment, a database server is configured to automatically capture information related to the execution of database commands that exhibit any one or combination of a number of user-specified interesting characteristics.

A database server that is able to capture information related to the execution of database commands that satisfy user-specified characteristics is able to provide an administrator with information that is important for reasons that are potentially unrelated to repeatability. For example, this technique allows an administrator to automatically capture information for certain types of database statements that would be useful for diagnostic or performance-tuning purposes.

A database server may facilitate this functionality by determining whether or not a database command exhibits one or more specified characteristics. These characteristics may be represented by any one or combination of hard-coded or user-specified criteria. If a database command satisfies the criterion or criteria, then, in step 270, the database command may capture information related to the execution of the database command, regardless of whether or not the database command was deemed repeatable in step 260.

For example, the database server may be configured to capture information for all database commands received over a certain period of time. Or, the database server may be configured to capture information for any database command whose text satisfies certain filters. The database server might also use a variety of other criteria, such as the identity of the database or object being accessed, the user or client from which the command was received, the application that caused the client issue the database command, an interface over which the command was received, the length of time required to execute the command, and so on.

Furthermore, the database server may be configured to altogether ignore the likelihood of repeatability as a factor in determining whether or not to capture information for a database command, skipping step 260 entirely.

3.2. Plan Histories

According to an embodiment of the invention, a database server maintains historical information related to the execution of a database command in the form of a plan history for that database command, such as a plan history 155 of FIG. 1.

The database server may persistently maintain a plan history for one or more database commands. The database commands for which the database server maintains a plan history may be selected by a database user, or may be automatically chosen by the database system based on some pre-defined criteria. For example, the database commands for which the database server maintains a plan history may be chosen by any one or combination of the system or user-specified criteria discussed in section 3.1, including repeatability.

The plan history may comprise information about various properties of the database command that are deemed useful and interesting, including properties such as the actual statement text, plan signature, plan outline, parsing schema, object and system statistics, compilation and execution parameters, bind variable types and values, parsing schema name, and optimizer version.

The plan history may also comprise information related to the actual executions of each plan that the database server has used for the database command over a certain period of time. This information may include statistics such as the number of times the plan has been executed, the timestamp of the last execution for the plan, total parse time, number of rows fetched by each operation in the plan, total elapsed time for execution, CPU time, memory size, number of physical and buffered I/Os, wait times, number of system messages, and other performance data.

According to an embodiment, enough information about a plan is stored in a plan history that any given plan in the history can be reproduced at a later time, even if the database system environment is radically different from the earlier one (provided, of course, that the objects referenced in the plan, like indexes, are still present).

The plan history for a database command may comprise an entry with some or all of the above information for each time the database server has executed the database command. The plan history may instead comprise a single entry for each query plan that the database server has executed or that the query optimizer has selected for a database command, with the information in that single entry reflecting either the most recent execution of the query plan or an aggregate or average of a certain number of recent executions of the query plan. According to an embodiment, some information in the plan history is stored in a single global entry, either in aggregate, such as the number of times a database command has been executed, or as a running average, such as the average execution time for the database command.

Ranking Query Plans

According to an embodiment of the invention, a group of query plans may be ranked based on the information for those query plans stored within their respective plan history. Such ranking may provide a database administrator with a prioritized view of the plan histories, thereby assisting the administrator in maintenance and tuning tasks. For example, the ranking may direct the administrator's attention to high-use, low-use, or resource-intensive query plans. Filters may be employed to help the administrator visualize which query plans are used by which applications or database commands. In response to the ranking, the administrator may then take actions such as tuning the database command or purging information for a particular query plan.

A ranking algorithm may take into account any one or combination of statistics and properties stored in the plan history. For example, query plans that have been executed most recently, most frequently, or from a particular application may have higher ranks. The query plans may also be independently sorted according to the values of the various statistics and properties stored for the query plans in the plan history.

The ranking algorithm may also assign different weights to different statistics or properties in a plan history, and the plan histories may then be sorted by their total weighted values. These weights may be configurable by the database administrator, or set by the database server itself.

Purging Query Plans

According to an embodiment, the database system may implement an automatic purging policy for the information about a query plan stored within a plan history. Such a policy may be designed, for instance, to prevent runaway space usage from stored plan histories or to prevent performance problems related to future changes to the plan history.

Figure 3:
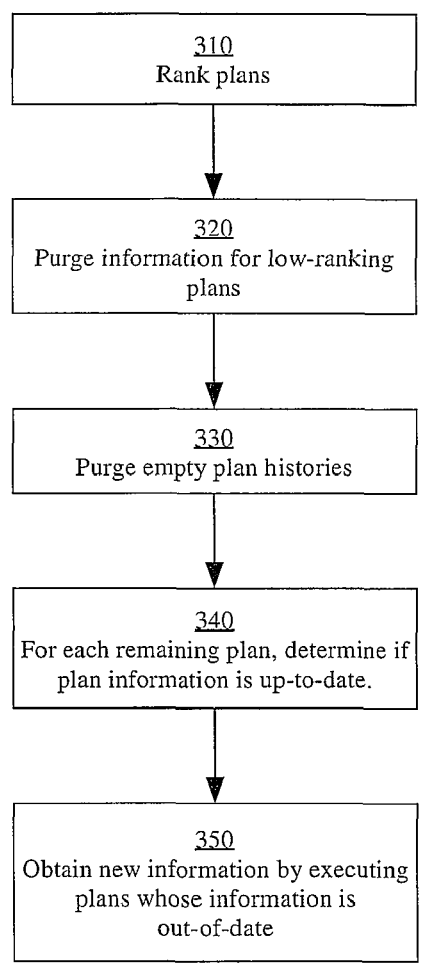
FIG. 3 illustrates a process flow 300 for the automatic purging and refreshing of plan history information, according to an embodiment of the invention.

FIG. 3 illustrates a process flow 300 for the automatic purging and refreshing of plan history information, according to an embodiment of the invention. This process, or portions thereof, may be performed as part of a regularly scheduled job, in response to a user command that instructs the database server to purge or refresh plan histories, or in response to the occurrence of certain conditions, such as the near exhaustion of storage space for plan histories.

In step 310, each query plan for which any plan history stores information is ranked according to a ranking algorithm as described above. This ranking algorithm may be chosen by the database server or configured by an administrator.

In step 320, information stored for lower ranking query plans is automatically purged by the database system. The number of plans for which information is purged may depend on the space pressures, time elapsed since last usage of the associated query plan, or other user-specified configuration parameters. For example, the database server may be configured to purge information for any query plan that has not been used in a year. As another example, the database server may be configured to purge enough low-ranking query plans to free up 500 MB of memory.

According to an embodiment, an administrator or application may designate a query plan non-purgeable, meaning that even if the plan ranks low, its information will not be purged. Database commands may also be designated as non-purgeable, meaning that each query plan in the plan history for that database command is non-purgeable.

In step 330, the database server evaluates each plan history for which query plan information was purged. If a plan history no longer contains information about any query plans, the plan history may itself be purged.

The process flow may then continue to step 340, which deals with automatically refreshing the plan history, or the process flow may end at this point.

Automatic Refresh

According to an embodiment, the information for a particular query plan in a plan history is updated each time the particular plan is executed. For example, if a plan history stores entries for a certain number of recent executions of a query plan, upon executing the query plan, the database server may add a new entry (or replace an outdated entry) with the relevant information from the current execution. If the plan history stores any averaged and aggregated statistics for the query plan, upon executing the query plan, the database server may update the averaged or aggregated statistics accordingly.

According to an embodiment, the information for a particular query plan in a plan history is not updated each time the particular plan is executed. When the particular plan is initially executed, the database server stores information related to that execution in the plan history. However, the database server does not necessarily update that information upon subsequent executions. This approach may be useful in reducing the overhead required to constantly update the plan history, since, in many cases, this information will not change significantly from one execution to another. However, certain cumulative statistics, such as the number of total executions, may still be updated for each execution.

In the latter embodiment, the information in a plan history will eventually grow old and out-of-date. For example, bind values may exhibit different characteristics, objects such as tables or indexes may grow or shrink resulting in different object statistics, or a plan may be executed much more frequently than before. Furthermore, in both embodiments, when a plan is not executed often (e.g. a plan that is only executed at the end of each month), the information in a plan history may be out-of-date when needed.

Use of the information in a query plan history is most likely to be beneficial when the stored information is relevant and up-to-date. Up-to-date statistics ensure that the query optimizer may more accurately predict the costs for each potential query plans. Furthermore, up-to-date execution statistics are useful in ranking plans, as described above, so that low-ranking plans or plans that have remained unused for an extended period of time may be deleted. Therefore, it is helpful to periodically refresh the information in plan history. Accordingly, a database server may automatic refresh the information in a plan history.

Returning now to step 340 of FIG. 3, which may be completed without the database server having completed steps 310 or 320, the database server may determine, for each query plan in each plan history (or for a certain number of high-ranking plans), whether the information for that query plan is sufficiently up-to-date. During such a check, for example, the database server may attempt to determine the age of the information for each query plan by examining a timestamp property that indicates when the information was generated. As another example, the database server may examine various properties in the plan history to determine how much the execution context has changed since the information was generated.

If the information for a query plan is not sufficiently up-to-date, then in step 350, database server may execute the query plan again to generate new information. Depending on the approach used by the database server for updating the information in the plan history, this new information may be substituted for, averaged with, or added to the information for the query plan already in the plan history.

For example, the database server may be configured to automatically refresh the information for a query plan if the information is older than a week. Or the database server may be configured to automatically refresh the information if the execution context has been significantly altered.

According to an embodiment, the conditions under which the database server may perform an automatic refresh (e.g. period of time or types of change in the execution context) may be configured by an administrator. According to an embodiment, the database server is configured to perform this automatic refresh during periods of low activity, to minimize the impact of the automatic refresh on performance.

In addition to or instead of periodically checking each query plan of each plan history, each time a database server executes a query plan, the database server may check to determine whether an automatic refresh is necessary. Again, the database server may base its determination of whether to perform the automatic refresh on such factors as the amount of time since the last update to the information for the query plan and whether or not the execution context has been significantly altered.

According to an embodiment, the database server may also refresh certain plan history information that needs to be updated often by periodically mining data from the cursor cache rather than directly updating the plan history after every execution. For example, the cursor cache may store data indicating the last execution time for a recent number of database commands, or implement a counter indicating how many times a database command or query plan has been executed since the last sweep of the cursor cache. The database server may periodically sweep the cursor cache and add the mined data to the appropriate plan histories.

3.3. Utilizing Captured Information and Plan Histories

According to an embodiment, the information captured in step 270 of FIG. 2, or maintained in a plan history as described in section 3.2, may subsequently be utilized by the database server or query optimizer in generating or selecting a query plan for future requests to perform the database command. For example, in step 230 of FIG. 2, if the database server has previously captured information related to the execution of a query plan for the database command, the database server may access that information and use it to assist in selecting a query plan for the database command.

The captured information may be useful in a variety of ways. For example, the captured information may include one or more stored outlines based on which the query optimizer may generate query plans. As another example, the captured information may include information indicating baseline plans or verification information, which may assist in selecting a query plan to execute. As another example, the captured information may include data regarding resource usage during certain steps of the query plan, thus helping the query optimizer better predict the actual costs associated with taking that step.

As another example, the captured information may include performance information that shows that a query plan has actual costs that are much higher then the predicted costs. This information may allow the query optimizer to better estimate the cost of selecting the query plan. As yet another example, the query optimizer may decide the extent to which it should adjust its estimates in the previous example by utilizing captured information related to the execution context. The query optimizer may compare the current execution context to information indicating the execution context at the time the performance information was captured. Based upon similarities between the current execution context and the execution context at the time the performance information was captured, the query optimizer may decide if, and to what extent, it should adjust its estimate based on the performance information. Factors that may be considered in judging similarities may include, for example, bind variables, indexes, access paths, optimizer versions, and so on.

Another use for the captured information is in determining how to best allocate system resources during query execution. For example, the plan history may indicate that a certain amount of total memory was used during an operation in the query plan, and therefore attempt to allocate a similar amount memory the next time it executes the query plan. As another example, information in a plan history may be utilized to intelligently schedule parallel execution of multiple database commands, such as in batch processing and reports.

Another use for the captured information is in reports to a database administrator. For example, based on the information in one or more plan histories, a database server may provide a report indicating how often a certain index is used. As another example, the database server may utilize information in a plan history to notify an administrator that a certain plan has become invalid because of an event such as a dropped index. As another example, the database server may utilize the captured information to generate reports about execution characteristics for a particular plan, such as the average number of rows fetched per execution. These reports may include, for example, trend analyses, such as an analysis of changes in the number of rows in tables or the distribution of column values over time.

Furthermore, a plan history allows a database server to detect changes to a query plan and any execution performance improvements or regressions. In response to detecting such changes, the database server may take appropriate action, such as reverting to an older plan in the plan history when a new plan does not perform as well as expected.

The above list of uses for captured information and plan histories is exemplary only, and one skilled in the art will recognize that many other uses are possible.

3.4. Plan Baselines

According to an embodiment, a database server may persistently maintain and utilize a baseline data indicating baseline plans for each database command in a group of database commands, such as a group of database commands identified through the techniques of sections 3.1 or 3.2. The set of baseline plans indicated by the baseline data may be referred to as a "plan baseline." Whereas stored outlines identify a single query plan for a database command regardless of the execution context, the plan baseline permits flexibility for selecting a different identified query plan from a plurality of query plans, depending on the execution context.

Figure 4:
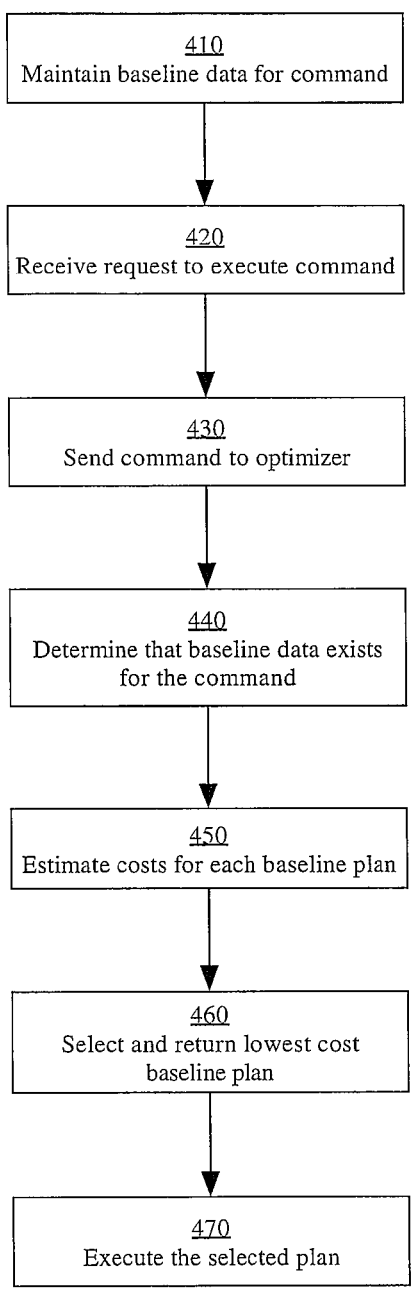
FIG. 4 illustrates a process flow 400 for utilizing plan baseline information while selecting a query plan for a database command, according to an embodiment of the invention.

FIG. 4 illustrates a process flow 400 for utilizing plan baseline information while selecting a query plan for a database command, according to an embodiment of the invention.

In step 410, a database server maintains baseline data indicating a set of baseline plans for a database command. The set of baseline plans includes one or more query plans that have been designated as acceptable for the database server to execute for the database command. The baseline data may be maintained, for example, as part of an object in SMB 150 of FIG. 1, or a similar repository.

For each query plan in the list of baseline plans, the database server maintains identifying information from which the database server may reconstruct the query plan. For example, the database server may maintain an outline for each query plan. According to an embodiment, each outline may be stored as part of a plan history for the database command, as discussed in section 3.2. According to an embodiment, for each plan in the plan history that belongs to the plan baseline, the database server stores baseline data indicating that the plan is part of the plan baseline. For example, the database server may maintain this baseline data in a separate column of the plan history, or as a separate table indexed upon an identifier from the plan history. Alternatively, a database server may be configured to assume that each plan in the plan history is a baseline plan.

According to an embodiment, a goal of the plan baseline is to identify all of the actually optimal plans for a database command. Note that there may be more than one actually optimal plan, since each plan may be actually optimal for a different execution context. Accordingly, each plan in a plan baseline may have been verified by the database server to be actually optimal for a certain execution context (see section 3.5). According to an embodiment, a plan may also be added to the plan baseline in response to a database user identifying the plan as an acceptable plan, or through other similar processes.

In step 420, the database server receives a request to perform the database command for which the plan baseline is being maintained. In step 430, the database server sends the command to the query optimizer.

In step 440, the query optimizer determines that the database server maintains the afore-mentioned plan baseline for the database command. Accordingly, in step 450, the query optimizer calculates total predicted costs for each query plan in the list of plan baselines plans, using the techniques discussed in this application or otherwise known for query optimizers.

In step 460, the query optimizer selects a lowest cost query plan from the set of baseline plans. The query optimizer returns the lowest-cost plan to the database server, which, in step 470, executes the selected query plan.

Under certain circumstances, the query optimizer may, at step 450, determine that none of the plans in the plan baseline are valid for the current execution context, and therefore are incapable of satisfying the query in the current execution context. For example, the execution context may recently have been altered in such a manner (e.g. a dropped index) that none of the baseline plans are capable of correctly performing the operations indicated by the database command. In these circumstances, the query optimizer may instead select a query plan from a list of new query plans generated by the query optimizer, using the techniques discussed above or otherwise known for query optimizers.

3.5. Query Plan Verification

According to an embodiment of the invention, a query plan must be verified before it may be selected by the query optimizer. When a query optimizer predicts that a new plan will perform a database command better than any other plan, the query optimizer notes the new plan, but selects an older, verified plan for executing the database command. Subsequently, the query optimizer may verify the new plan by executing it, so as to determine whether or not the new plan performs as well as predicted (or, at least, better than other verified plan).

According to this embodiment, a database server stores verification data for certain query plans. This verification data may take many forms. For example, the database server may store an outline for each verified query plan in a table of verified query plans. As another example, information about query plans may be stored in a plan history for the database command, which information may either include or be associated with data indicating whether a query plan is verified. As another example, the database server may persistently maintain verification data indicating a set of verified query plans in the form of a plan baseline, as described in section 3.5.

Figure 5:
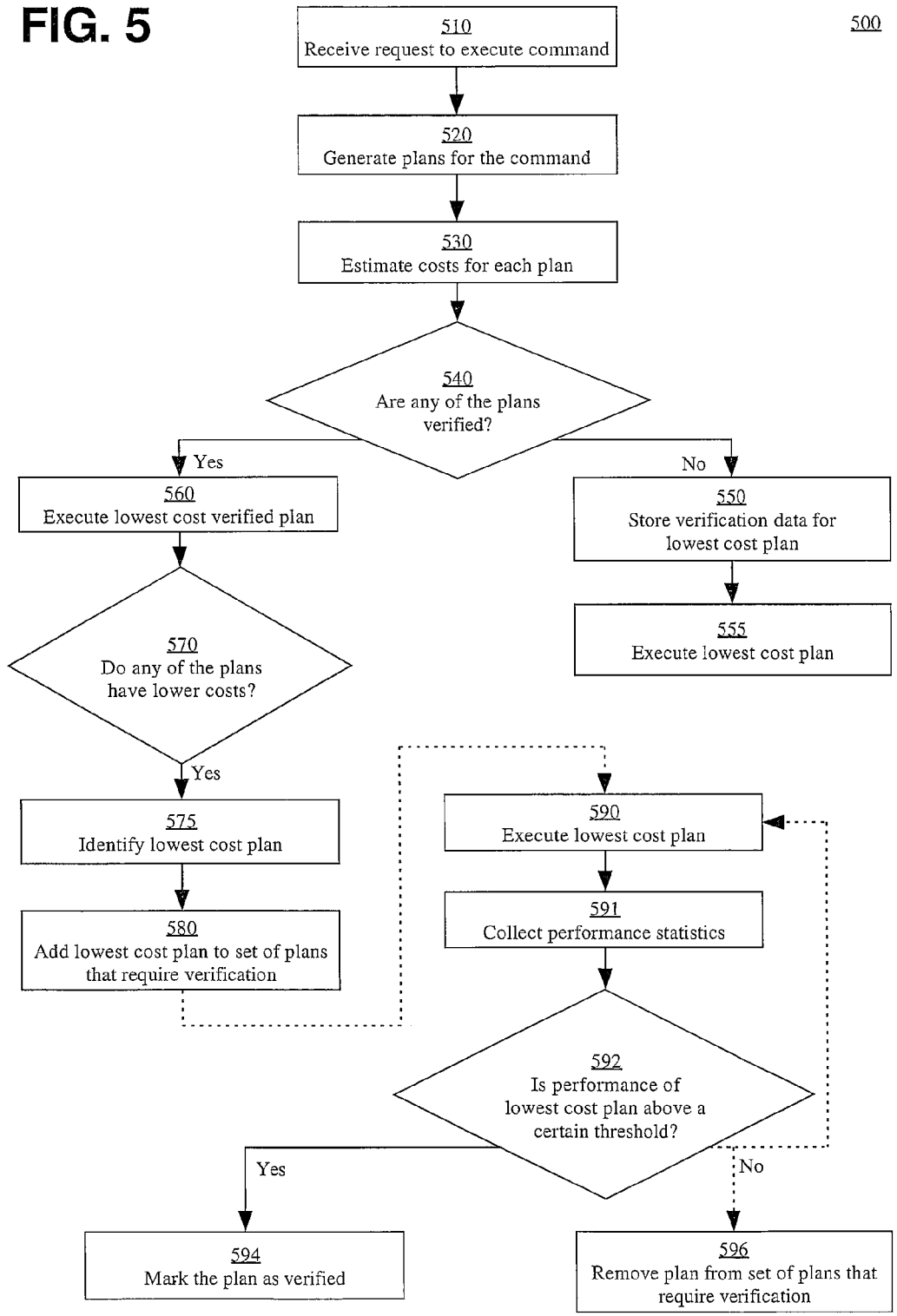
FIG. 5 illustrates a process flow 500 for utilizing verification information while selecting a query plan for a database command, according to an embodiment of the invention.

FIG. 5 illustrates a process flow 500 for utilizing verification information while selecting a query plan for a database command, according to an embodiment of the invention.

In step 510, the database server receives a request to execute a database command, which it forwards to the query optimizer. In step 520, the query optimizer generates a number of alternative query plans for the database command, using techniques described in this application or otherwise known. For example, the query optimizer may generate plans A, B, C, and D. In step 530, the query optimizer estimates predicted costs for performing each of the alternative query plans. For example, the query optimizer may predict the costs of A to be 4, B to be 6, C to be 7, and D to be 5.

In step 540, the query optimizer determines if any of the alternative query plans are verified. To determine if any of the alternative query plans are verified, the query optimizer checks for verification data for each of the alternative query plans.

If none of the alternative plans are verified, then, in step 550, the query optimizer stores verification data indicating the query plan with the lowest total predicted costs as verified. In step 555, the query optimizer returns this plan to the database server for execution. So, for example, if none of plans A, B, C, or D are verified, the query optimizer would return plan A, which has the lowest total predicted costs.

If at least one of the alternative plans is verified, then in step 560, rather than risk the unknown performance of an unverified plan, the query optimizer returns to the database server the verified query plan with the lowest total predicted costs. For example, if the query optimizer determines that both B and C are verified, the database server would execute plan B because its costs are lower than those of C. The database server would execute verified plan B even though an unverified plan, plan A, is predicted to have lower costs.

In step 570, the query optimizer determines if any other query plan in the set of alternative query plans has lower total predicted costs than the verified query plan sent to the database server in step 560. If so, then, in step 575, the query optimizer identifies the query plan in the set of alternative query plans with the lowest total predicted cost. For example, the query optimizer may identify plan A, because the cost of plan A is lower than any other plan.

In step 580, the query optimizer adds the identified query plan to a set of query plans that require verification. For example, this set may be indicated by data in a separate table accessible to the database server. Or, for example, the plan history for the database command may include data indicating whether or not a query plan is in the set of query plans that require verification. Alternatively, any unverified query plan in the plan history is assumed to be in the set of query plans that require verification.

In step 590, the database server attempts to verify the identified plan by executing it. As indicated by the dotted lines of FIG. 5, this determination may begin at any time after step 580, from seconds to weeks or even later. According to an embodiment, performance of step 590 does not necessarily occur in response to completion of step 580. Rather, step 590 may be performed in response to other events, such as the running of a scheduled task.

In step 591, the database server collects performance statistics related to execution in step 590. In step 592, based on the collected performance statistics, the database server evaluates the performance of the identified plan to determine if the identified plan performed above some threshold level. For example, the database server may determine whether or not the identified plan's actual costs were within a certain margin of error of or lower than the predicted costs for the identified plan. As another example, the database server may determine if the actual costs of the identified plan are better than the actual costs of the other verified plans for the database command. To make this determination, the database server may execute the verified plan having the lowest total predicted costs for the current execution context, and compare the actual costs of the identified plan with the actual costs of the verified plan having the lowest total predicted costs. Alternatively, the database server may re-execute more than one-or even all-of the verified plans to determine the actual costs of the more than one verified plans in the current execution context.

According to an embodiment, the threshold level is set at a certain percentage above the actual performance of the tested verified plan or plans. For example, the identified plan may be verified only if it offers performance more than 33% better than the tested verified plan or plans. However, the threshold level may be set at any level in relation to the performance of a verified plan, including at a level below the performance of the verified plan.

If the identified plan performs above the threshold level, then, in step 594, the database server stores verification data for the identified plan. Otherwise, flow proceeds directly to step 596, in which the identified plan is removed form the set of query plans that require verification.

However, according to an embodiment, the database server may not perform step 596, and instead attempt to verify the query plan again at a later time or in a different execution context. According to an embodiment, the database server may periodically repeat steps 590-594 until the query plan is either verified or purged. Verification may be attempted, for example, at server-defined or user-configured intervals. To assist with the scheduling verification attempts, the database server may record the timestamp of the most recent verification attempt. The database server also may be configured to only attempt verification a certain number of times, after which the database server may perform step 596.

The database server may automatically perform steps 590-596 for each query plan in each list of query plans that require verification as part of a periodically scheduled job. The database server may also perform steps 590-596 as a background process whenever the database server detects that it has enough free resources to avoid compromising the performance of the database server with respect to the database applications that rely on the database server. An administrator may also force the database server to attempt to verify some or all of the unverified query plans by issuing a "verify" command.

Concurrent Verification

According to an embodiment, verification may occur concurrently with the execution of a verified plan in response to the request for which a new plan was generated. The query optimizer may identify two different plans to the database server: the lowest cost plan identified in step 580 and the lowest cost verified plan identified in step 550. The database server may run both of these plans concurrently. As soon as the first of these plans completes the operations indicated by the database command, the database server may return the results from that plan. If the first plan to complete is not the verified plan (i.e. the plan identified in step 575), the database server may store data verifying the previously unverified plan.

This embodiment may not require the database sever to maintain a set of query plans that require verification, as verification is attempted concurrently with the execution of the database command. This embodiment ensures that the database command may be executed with performance at least as good as that of any verified plan, but possibly better in the case that the new plan performs better than the verified plan.

Optimistic Verification

According to an embodiment, the database server may be configured to optimistically assume that the query optimizer will predict the total costs of the query plans it generates with reasonable accuracy, and that a new plan selected by the query optimizer is therefore likely to be actually optimal. Accordingly, the database server may, upon first generating a new plan, utilize that plan without it being verified during a certain trial period. At the end of the period, the new plan is either permanently verified as acceptable for executing the database command, or marked as unacceptable, in which case it may no longer be used to execute the database command.

According to this embodiment, verification data instead indicates one of three possibilities: (1) the plan is permanently verified to be acceptable for execution; (2) the plan preliminarily assumed to be acceptable for execution; or (3) the plan is permanently verified to be unacceptable for execution.

When the optimizer generates a new plan for the first time (i.e. a plan for which no verification data exists), verification data is generated for the new plan indicating that it is preliminarily assumed to be acceptable. The new plan is then effectively placed on probation, during which time the query optimizer may utilize the query plan as if it were permanently verified. During this time, performance statistics are collected and maintained for the new plan.

Subsequently, the collected statistics are evaluated by the database server or administrator. For example, this evaluation may occur automatically after a certain period of time or number of executions. Based on the collected statistics, and also possibly based on a comparison to statistics collected for other verified query plans, the server or administrator may decide to permanently verify the plan as either acceptable or unacceptable.

3.6. Plan Baseline Evolution

According to an embodiment, a database server may evolve a plan baseline over time by adding new query plans that are actually optimal or otherwise acceptable for new execution contexts. For example, if a user has just created an index on a table, no existing plan in the plan baseline would use that index, even though using that index may be more efficient than certain steps used by the pre-existing query plans in the plan baseline. Thus, the database server may feature techniques for adding to the plan baseline a new plan that uses the index.

According to an embodiment, a query optimizer always generates a new query plan in response to receiving a database command. However, the new query plan is only executed if the new query plan is already in the plan baseline. Otherwise, the new query plan is added to a set of potential baseline plans, where it may later be accepted and added to the plan baseline.

Figure 6:
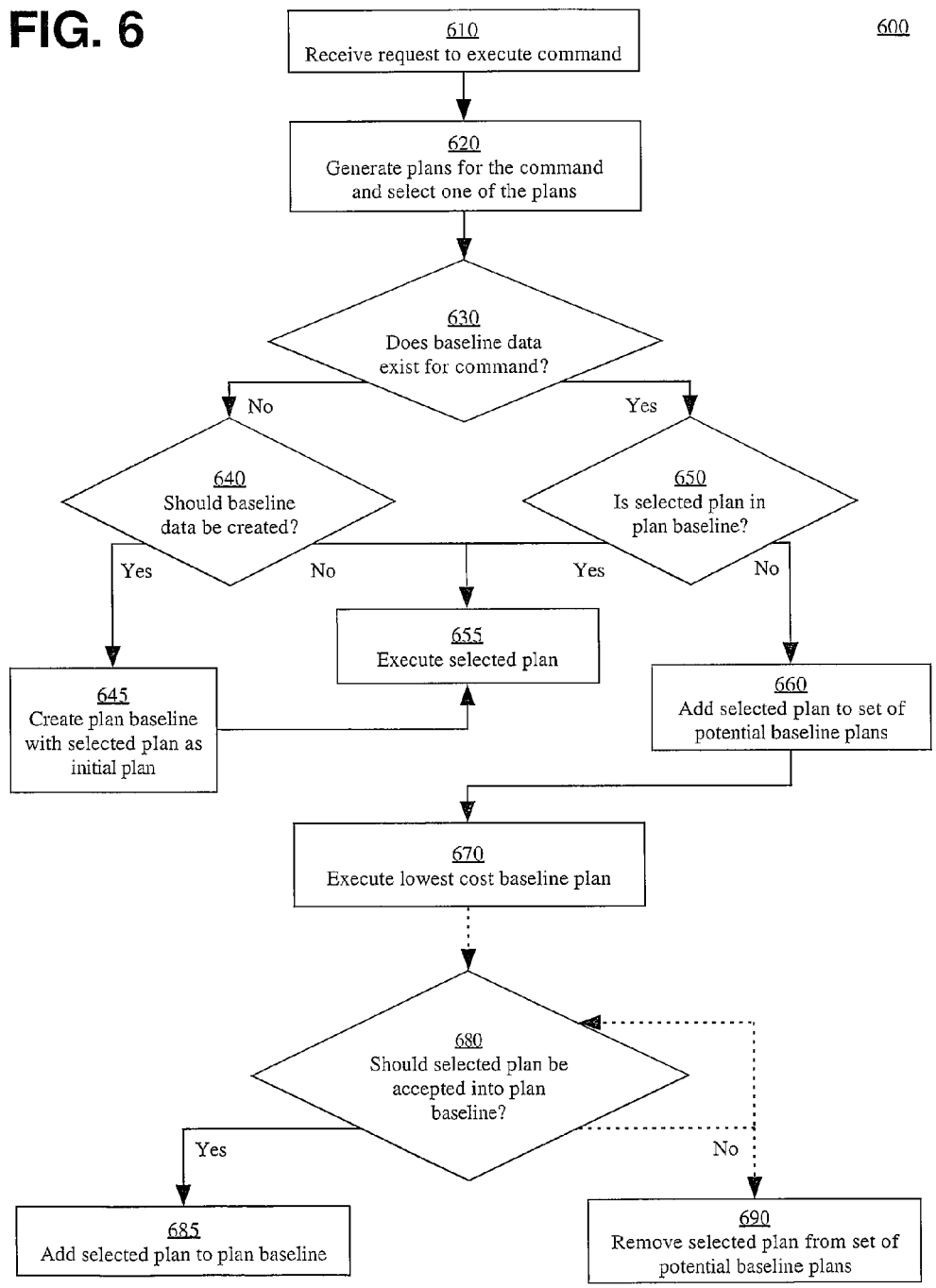
FIG. 6 illustrates a process flow 600 for evolving a plan baseline for a database command, according to an embodiment of the invention.

FIG. 6 illustrates a process flow 600 for evolving a plan baseline for a database command, according to an embodiment of the invention.

In step 610, the database server receives a request to perform a database command, in response to which it forwards the database command to the query optimizer. In step 620, the query optimizer generates a number of alternative query plans for the database command. The query optimizer then selects the generated plan with the lowest predicted total cost. This step may be performed using techniques described in this application or otherwise known.

In step 630, the query optimizer determines whether or not a plan baseline exists for the database command. If no plan baseline exists, then, in step 640, the query optimizer determines whether or not a plan baseline should be created. The query optimizer may base this decision on the same criteria as discussed for determining whether or not to store information about or a plan history for the database command, as discussed in sections 3.1 or 3.2. For example, the query optimizer may decide to create plan baselines for every repeatable database command, or for any database command for which it determines it should maintain a plan history.

If the query optimizer determines to create a plan baseline, then, in step 645, the database server creates the plan baseline and adds the query plan selected in step 630 as an initial query plan for the plan baseline.

However, if a plan baseline already exists for the database command, then, in step 650, the query optimizer determines whether or not the plan selected in step 630 is in the plan baseline. If the selected plan is in the plan baseline, then in step 655, the selected plan is returned to the database server, and the database server executes the selected plan.

Otherwise, in step 660, the query optimizer adds the selected plan to a set of potential baseline plans for the database command. The database server may maintain data indicating this set of potential baseline plans in the form of a table, each potential baseline plan being associated with its respective database command. Alternatively, this step may be accomplished by adding the baseline plan to a plan history for the database command. Data identifying the plan as a potential baseline plan, as opposed to a baseline plan or non-baseline plan, may be associated with selected plan in the plan history. According to an embodiment, the set of potential baseline plans and the set of query plans that require verification, discussed in section 3.5, are the same.

In step 670, rather than risk the unknown performance of the plan selected in step 630, the query optimizer selects a baseline plan to execute the database command, using steps 450 and 460 of FIG. 4. In step 675, the selected baseline plan is returned to the database server, and the database server executes the selected plan.

In step 680, the database server determines whether or not to accept the potential baseline plan added in step 660 into to the plan baseline. As indicated by the dotted lines of FIG. 6, this determination may occur any time after step 675, from seconds to weeks or even later. According to an embodiment, performance of step 680 does not necessarily occur in response to completion of step 675. Rather, step 680 may be performed in response to other events, such as the running of a scheduled task.

The determination of step 680 may occur in a number of ways. For example, a database administrator may request to see a list of potential baseline plans that have been generated for a database command. The administrator may decide, for each potential baseline plan in the list, whether or not to accept the potential baseline plan as part of the plan baseline. To assist the administrator in making the determination, the database server may allow the administrator to visualize or execute the potential baseline plan, so as to observe its performance.

As another example, the database server may itself determine whether or not to accept a potential baseline plan during a plan tuning process. As yet another example, the database server may utilize the verification process shown in steps 590-596 of FIG. 5 to determine whether or not to accept a potential baseline plan.

If the potential baseline plan is determined to be acceptable, then, in step 685, the potential baseline plan is added to the plan baseline. Otherwise, in step 690, instead of being accepted, the potential baseline plan may be rejected and marked as a non-baseline plan.

Alternatively, even though the potential baseline plan has been rejected, the database server may still maintain the potential baseline plan in the set of potential baseline plans, in case it becomes acceptable at a later time in a different execution context. According to an embodiment, step 680 may be repeated any number of times before performing step 690. For example, the database administrator may later re-test the potential baseline plan in a different execution context. Or, the database server may periodically attempt to verify the potential baseline plan until it is either accepted or purged.

According to an embodiment, when the plan baseline is evolved to include one or more query plans adapted to one or more new execution contexts, older plans are not necessarily removed from the plan baseline. This is because the execution context may, at times, revert to an older execution context, in which the older plans would most likely still be optimal. However, a database server may be configured to purge query plans from the plan baseline that remain unused for an extended period of time, or which are made permanently obsolete by certain changes to the database system.

Other techniques for evolving a plan baseline may also exist. For example, a database server may be configured to periodically and automatically generate, verify, and add to the plan baseline new query plans for a stored database command. Or, for example, the database server may be configured to act similarly in response detecting certain events, such as a significant change to the execution context, a period of low database activity, or receipt of a special "evolve" command.

As yet another example of a technique for evolving the plan baseline, a database server may feature a command for importing query plans into the plan baseline. For example, a database administrator may load query plans into the plan baseline from a tuning set, Automatic Workload Recover (AWR) snapshot, or cursor cache. Or, a database administrator may design and test query plans on one system, and then export those query plans as baseline plans on another system.

As yet another example of a technique for evolving the plan baseline, the database administrator may utilize a tuning interface to create a profile for a database command. At the time the database administrator stores a profile for use on the database server—for example, when the administrator approves of a profile generated by a tuning advisor—the database server may automatically generate and add to the plan baseline one or more query plans generated based on that profile in the current execution context.

According to an embodiment, certain query plans in a plan baseline may be "fixed," so that they are chosen over non-fixed plans when possible, even if a non-fixed plan is determined to have a lower cost. Thus, the database system may feature a mechanism for preferring one set of baseline plans over another.

4.0. Implementation Mechanism—Hardware Overview

Figure 7:
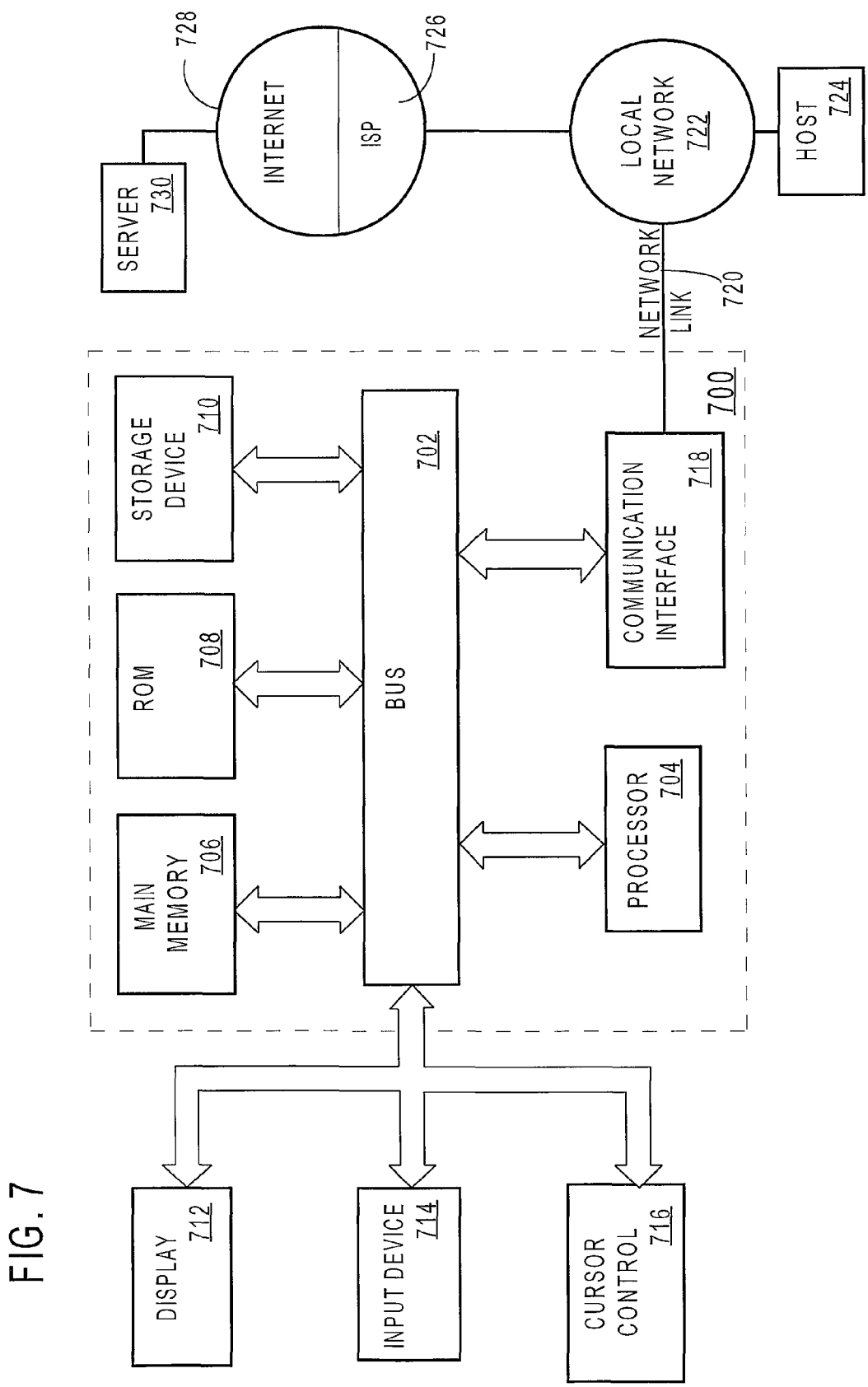
FIG. 7 is block diagram of a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

5.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
receiving a request to execute a database command;
determining a particular plan for executing the database command; and
adding, to a plan history of a plurality of plans that have been used to execute the database command, a particular entry comprising execution statistics captured from executing the particular plan, wherein the particular entry is specific to the particular plan;
wherein the plan history comprises a plurality of entries, wherein each entry is specific to a particular plan within the plurality of plans that have been used to execute the database command, wherein each plan of the plurality of plans that have been used to execute the database command is uniquely associated with at least one different entry in the plan history for the database command;
wherein the method is performed by one or more computing devices.

2. The method of claim 1, wherein the execution statistics includes at least one of the following: a timestamp for the execution of the particular plan, total parse time, number of rows fetched by each operation in the particular plan, total elapsed time for execution, processor time, memory size, number of physical and buffered input/output operations, wait times, or number of system messages.

3. The method of claim 1, further comprising adding to the particular entry at least one of a: plan outline, parsing schema, object or system statistic, compilation or execution parameter, bind variable type or value, parsing schema name, or optimizer version.

4. The method of claim 1, further comprising:
determining that the database command matches one or more pre-defined criteria;
wherein the one or more pre-defined criteria include at least one of:
(a) whether or not the database command has been received in a previous request;
(b) the existence of bind variables in the database command;
(c) receipt of the database command from a particular user, client, or application;
(d) the database command refers to a particular database or object; or
(e) the crossing of a certain threshold by an indicator for a resource utilized while executing the database command;
wherein adding the execution statistics to the plan history occurs in response to determining that the database command matches the one or more pre-defined criteria.

5. A method comprising:
persistently maintaining historical information related to one or more plans for executing a database particular command;
determining, at an initial time, that the historical information does not include execution statistics captured from executing a particular plan for a database command;
based on having determined at the initial time that the historical information does not include execution statistics captured from executing the particular plan, capturing execution statistics for an initial execution of the particular plan and recording the captured execution statistics to the historical information;
determining, at a first subsequent time, that the historical information includes execution statistics captured from executing the particular plan;
based on having determined at the first subsequent time that the historical information includes execution statistics captured from executing the particular plan, determining not to update the historical information to reflect a first subsequent execution of the particular plan;
determining, at a second subsequent time, that execution statistics for the particular plan recorded in the historical information are out-of-date;
based on having determined at the second subsequent time that the execution statistics for the particular plan recorded in the historical information are out-of-date, capturing execution statistics for a second subsequent execution of the particular plan and, based on the captured execution statistics for the second subsequent execution, updating the historical information;
wherein the method is performed by one or more computing devices.

6. The method of claim 5, further comprising:
while persistently maintaining the plan history, receiving a request to execute the database command;
wherein determining at the second subsequent time that the execution statistics for the particular plan recorded in the historical information are out-of-date occurs in response to receiving the request to execute the particular plan.

7. The method of claim 5, wherein determining at the second subsequent time that the execution statistics for the particular plan recorded in the historical information are out-of-date occurs in response to a scheduled job.

8. The method of claim 5 wherein determining at the second subsequent time that the execution statistics for the particular plan recorded in the historical information are out-of-date comprises determining that a particular amount of time has passed since the execution statistics for the particular plan were last recorded to the historical information.

9. The method of claim 5 wherein determining at the second subsequent time that the execution statistics for the particular plan recorded in the historical information are out-of-date comprises determining that a particular aspect of the execution context has changed since the execution statistics for the particular plan were last recorded to the historical information.

10. The method of claim 5 wherein updating the historical information comprises at least one of:

adding, as an entry associated with the particular plan, the execution statistics captured for the second subsequent execution of the particular plan; or replacing, averaging, or aggregating information in an entry associated with the particular plan with the execution statistics captured for the second subsequent execution of the particular plan.

11. A method comprising:

persistently maintaining a plurality of entries of historical information related to one or more plans for executing one or more database commands;

wherein, for each particular plan of the one or more plans, the historical information includes at least one entry comprising data, for one or more particular attributes, that was captured in response to executing the particular plan;

generating a ranked list of plans by, for each plan of the one or more plans for each of the one or more commands, ranking the plan based on the data, for the one or more particular attributes, that is specific to the plan;

based on the ranked list of plans, identifying a first set of one or more plans in the ranked list of plans that are ranked lower than any plan in a second set of one or more plans in the ranked list of plans;

for each plan in the first set of one or more plans, deleting any entry in the plurality of entries of historical information that is specific to that plan;

wherein the method is performed by one or more computing devices.

12. The method of claim 11, further comprising selecting each plan in the first set of one or more plans, at least in part, because of ranking criteria indicating that each plan in the first set of one or more plans was last executed before a particular time.

13. The method of claim 11, further comprising identifying the first set of one or more plans by:

identifying a particular size in memory;

selecting the first set of one or more plans to be such that the size, in memory, of information maintained for the first set of one or more plans is approximately equal to the particular size.

14. The method of claim 11, wherein:

the ranked list of plans further comprises a third set of plans different than the first set of plans;

wherein at least one plan in the third set of plans ranks lower in the ranked list of plans than at least one plan in the first set of plans;

wherein each plan in the third set of plans is determined to be in the third set of plans because the plan is marked as non-purgeable;

wherein the database server does not purge any plan in the third set of plans.

15. The method of claim 11, further comprising at least one of displaying the ranked list to a user or tuning a certain number of high ranking plans in the ranked list of plans.

16. The method of claim 11, wherein the one or more particular attributes comprise at least one of a: timestamp indicating a time when the plan was last executed, frequency of use, associated application, or resource usage statistic.

17. One or more non-transitory computer-readable storage medium storing one or more sequences of instructions which, when executed by one or more processors, causes the one or more processors to perform the method recited in claim 1.

18. One or more non-transitory computer-readable storage medium storing one or more sequences of instructions which, when executed by one or more processors, causes the one or more processors to perform the method recited in claim 2.

19. One or more non-transitory computer-readable storage medium storing one or more sequences of instructions which, when executed by one or more processors, causes the one or more processors to perform the method recited in claim 3.

20. One or more non-transitory computer-readable storage medium storing one or more sequences of instructions which, when executed by one or more processors, causes the one or more processors to perform the method recited in claim 4.

21. One or more non-transitory computer-readable storage medium storing one or more sequences of instructions which, when executed by one or more processors, causes the one or more processors to perform the method recited in claim 5.

22. One or more non-transitory computer-readable storage medium storing one or more sequences of instructions which, when executed by one or more processors, causes the one or more processors to perform the method recited in claim 6.

23. One or more non-transitory computer-readable storage medium storing one or more sequences of instructions which, when executed by one or more processors, causes the one or more processors to perform the method recited in claim 7.

24. One or more non-transitory computer-readable storage medium storing one or more sequences of instructions which, when executed by one or more processors, causes the one or more processors to perform the method recited in claim 8.

25. One or more non-transitory computer-readable storage medium storing one or more sequences of instructions which, when executed by one or more processors, causes the one or more processors to perform the method recited in claim 9.

26. One or more non-transitory computer-readable storage medium storing one or more sequences of instructions which, when executed by one or more processors, causes the one or more processors to perform the method recited in claim 10.

27. One or more non-transitory computer-readable storage medium storing one or more sequences of instructions which, when executed by one or more processors, causes the one or more processors to perform the method recited in claim 11.

28. One or more non-transitory computer-readable storage medium storing one or more sequences of instructions which, when executed by one or more processors, causes the one or more processors to perform the method recited in claim 12.

29. One or more non-transitory computer-readable storage medium storing one or more sequences of instructions which, when executed by one or more processors, causes the one or more processors to perform the method recited in claim 13.

30. One or more non-transitory computer-readable storage medium storing one or more sequences of instructions which, when executed by one or more processors, causes the one or more processors to perform the method recited in claim 14.

31. One or more non-transitory computer-readable storage medium storing one or more sequences of instructions which, when executed by one or more processors, causes the one or more processors to perform the method recited in claim 15.

32. One or more non-transitory computer-readable storage medium storing one or more sequences of instructions which, when executed by one or more processors, causes the one or more processors to perform the method recited in claim 16.

* * * * *

UNITED STATES PATENT AND TRADEMARK OFFICE
CERTIFICATE OF CORRECTION

PATENT NO.        : 8,335,767 B2
APPLICATION NO.   : 12/188673
DATED             : December 18, 2012
INVENTOR(S)       : Das et al.

It is certified that error appears in the above-identified patent and that said Letters Patent is hereby corrected as shown below:

On page 3, in column 2, under "Other Publications" (56), line 35, delete "SIGMOND" and insert -- SIGMOD --, therefor.

In column 4, line 55, delete "outlines."Database" and insert -- outlines." Database --, therefor.

In column 20, line 14, delete "then" and insert -- than --, therefor.

In column 23, line 51, delete "form" and insert -- from --, therefor.

In column 24, line 24, delete "sever" and insert -- server --, therefor.

Signed and Sealed this
Nineteenth Day of March, 2013

Teresa Stanek Rea
*Acting Director of the United States Patent and Trademark Office*